US012262446B2

(12) United States Patent
Grayson et al.

(10) Patent No.: US 12,262,446 B2
(45) Date of Patent: Mar. 25, 2025

(54) PROVIDING A ROAMING POLICY FEDERATION IN A THIRD GENERATION PARTNERSHIP PROJECT (3GPP) NETWORK ENVIRONMENT

(71) Applicant: Cisco Technology, Inc., San Jose, CA (US)

(72) Inventors: Mark Grayson, Berkshire (GB); Timothy Peter Stammers, Raleigh, NC (US); Desmond Joseph O'Connor, London (GB); Bart A. Brinckman, Nevele (BE)

(73) Assignee: CISCO TECHNOLOGY, INC., San Jose, CA (US)

( * ) Notice: Subject to any disclaimer, the term of this patent is extended or adjusted under 35 U.S.C. 154(b) by 349 days.

(21) Appl. No.: 17/954,717

(22) Filed: Sep. 28, 2022

(65) Prior Publication Data
US 2023/0021642 A1 Jan. 26, 2023

Related U.S. Application Data

(63) Continuation-in-part of application No. 17/315,581, filed on May 10, 2021, now Pat. No. 11,700,525.
(Continued)

(51) Int. Cl.
*H04W 8/12* (2009.01)
(52) U.S. Cl.
CPC .................. *H04W 8/12* (2013.01)
(58) Field of Classification Search
CPC ...................................................... H04W 8/12
(Continued)

(56) References Cited

U.S. PATENT DOCUMENTS 8,638,749 B2 * 1/2014 Cherian ............ H04W 36/1446
370/395.5
8,924,535 B2 12/2014 Horn et al.
(Continued)

FOREIGN PATENT DOCUMENTS

WO 2021035499 A1 3/2021

OTHER PUBLICATIONS

Telecompedia, "SIB1 in LTE", https://telecompedia.net/sib1-in-lte/, downloaded Feb. 4, 2021, 8 pages.
(Continued)

*Primary Examiner* — Nghi H Ly
(74) *Attorney, Agent, or Firm* — Edell, Shapiro & Finnan, LLC

(57) ABSTRACT

Presented herein are techniques associated with replicating an OpenRoaming™ policy federation in a Third Generation Partnership Project (3GPP) network environment. For example, techniques herein provide a roaming policy federation architecture for a 3GPP network environment. In one example a method is provided that may include encoding at least one multi-bit roaming policy for an identity provider and a plurality of bit-wise combinatorial permutations of the at least one multi-bit roaming policy within each of a plurality of multi-bit 3GPP broadcast identifiers, wherein the at least one multi-bit roaming policy includes bit-wise roaming policy information for the identity provider and configuring the multi-bit 3GPP broadcast identifiers for a mobile device associated with the identity provider, wherein the multi-bit 3GPP broadcast identifiers indicate that the mobile device is to connect to a visited radio access network associated with a local Internet Protocol (IP) access service or a home routed access service.

20 Claims, 13 Drawing Sheets

Related U.S. Application Data

(60) Provisional application No. 63/073,642, filed on Sep. 2, 2020.

(58) Field of Classification Search
USPC .............. 370/329, 328, 338, 341, 345, 350
See application file for complete search history.

(56) References Cited

U.S. PATENT DOCUMENTS

| | | | |
|---|---|---|---|
| 10,813,042 B1 | 10/2020 | Gundavelli et al. | |
| 11,337,147 B2 | 5/2022 | Gundavelli et al. | |
| 2012/0084834 A1* | 4/2012 | Brown | H04W 12/04 709/219 |
| 2015/0148033 A1 | 5/2015 | Kim et al. | |
| 2015/0312824 A1* | 10/2015 | Thalanany | H04L 67/12 455/435.1 |
| 2016/0183169 A1 | 6/2016 | Horn et al. | |
| 2017/0201938 A1 | 7/2017 | Kim et al. | |
| 2017/0295540 A1 | 10/2017 | Gupta | |
| 2017/0339634 A1* | 11/2017 | Fine | H04W 84/00 |
| 2019/0191470 A1 | 6/2019 | Joseph et al. | |
| 2020/0120481 A1 | 4/2020 | Grayson et al. | |
| 2020/0163013 A1 | 5/2020 | Grayson et al. | |
| 2020/0228967 A1 | 7/2020 | Chan et al. | |
| 2022/0060893 A1 | 2/2022 | Gundavelli et al. | |
| 2022/0070652 A1 | 3/2022 | Grayson et al. | |
| 2023/0021642 A1* | 1/2023 | Grayson | H04W 8/12 |

OTHER PUBLICATIONS

Techplayon, "PLMN Selection in LTE (Idle Mode Action)", http://www.techplayon.com/plmn-selection-in-lte-idle-mode-action/, Apr. 25, 2019, 8 pages.
MulteFire Alliance, "MulteFire Release 1.0 Technical Paper", Jan. 2017, 25 pages.
Wikipedia, "List of DNS record types", Feb. 23, 2021, https://en.wikipedia.org/wiki/List_of_DNS_record_types, 13 pages.
Cisco, "Hotspot 2.0", https://www.cisco.com/c/en/US/td/docs/wireless/controller/9800/17-2/config-guide/b_wl_17_2_cg/hotspot_2_0.pdf, downloaded May 6, 2021, 14 pages.
Cisco, "DNS Resource Records", https://www.cisco.com/c/en/us/support/docs/ip/domain-name-system-dns/12684-dns-resource.html, Sep. 11, 2018, 7 pages.
3GPP, "5G for Industry 4.0", https://www.3gpp.org/news-events/2122-tsn_v_lan, May 13, 2020, 4 pages.
CBS Alliance, "CBRS Alliance Identifier Guidelines for Shared HNI", CBRSA-TR-0100, V1.0.0, Nov. 27, 2018, 18 pages.
3GPP, "3rd Generation Partnership Project; Technical Specification Group Core Network and Terminals; Evolved Packet System (EPS); Mobility Management Entity (MME) and Serving GPRS Support Node (SGSN) related Interfaces based on Diameter protocol (Release 16)", 3GPP TS 29.272 V16.5.0, Dec. 2020, 177 pages.
3GPP, "3rd Generation Partnership Project; Technical Specification Group Radio Access Network; NR; Radio Resource Control (RRC) protocol specification (Release 16)", 3GPP TS 38.331 V16.3.1, Jan. 2021, 932 pages.
3GPP, "3rd Generation Partnership Project; Technical Specification Group Services and System Aspects; Study on enhanced support of non-public networks (Release 17)", 3GPP TR 23.700-07 V1.2.0, Nov. 2020, 247 pages.
3GPP, "3rd Generation Partnership Project; Technical Specification Group Services and System Aspects; System architecture for the 5G System (5GS); Stage 2 (Release 17)", 3GPP TS 23.501 V17.0.0, Mar. 2021, 489 pages.
3GPP, "3rd Generation Partnership Project; Technical Specification Group Core Network and Terminals; Numbering, addressing and identification; (Release 17)", 3GPP TS 23.003 V17.0.0, Dec. 2020, 142 pages.
3GPP, "3rd Generation Partnership Project; Technical Specification Group Services and System Aspects; Service requirements for the 5G system; Stage 1 (Release 18)", 3GPP TS 22.261 V18.1.1, Jan. 2021, 85 pages.
3GPP, "3rd Generation Partnership Project; Technical Specification Group Services and System Aspects; Service accessibility (Release 17)", 3GPP TS 22.011 V17.3.0, Dec. 2020, 34 pages.
Hughes Systique, "OpenRoaming—A Global Wi-Fi Roaming Enabler," https://hsc.com/Resources/Blog/OpenRoaming-A-Global-Wi-Fi-Roaming-Enabler, Jul. 13, 2020, 8 pages.
Jerome Henry, "Boost Your WLAN Efficiency with Device-Specific Tuning," Cisco, BRKEWN-2178, Apr. 21, 2020, 86 pages.
3GPP, "3rd Generation Partnership Project; Technical Specification Group Core Network and Terminals; Characteristics of the Universal Subscriber Identity Module (USIM) application (Release 17)," 3GPP TS 31.102 V17.1.0, Mar. 2021, 327 pages.
3GPP, "3rd Generation Partnership Project; Technical Specification Group Core Network and Terminals; Non-Access-Stratum (NAS) protocol for Evolved Packet System (EPS); Stage 3 (Release 17)," 3GPP TS 24.301 V17.2.0, Mar. 2021, 588 pages.
3GPP, "3rd Generation Partnership Project; Technical Specification Group Core Network and Terminals; Non-Access-Stratum (NAS) functions related to Mobile Station (MS) in idle mode (Release 17)," 3GPP TS 23.122 V17.2.0, Mar. 2021, 94 pages.
CBRS Alliance, "CBRS Network Services Stage 2 and 3 Specification", V3.0.0, Feb. 18, 2020, XP055867207, 55 pages.
Motorola Mobility, "Preferred Realm/OUI in ANDSF Policies", 3GPP Draft, S2-120792 ANDSF REALM, 3rd Generation Partnership Project (3GPP), vol. SA WG2, XP050576656, Jan. 31, 2012, 6 pages.
AT&T et al., "Use of OPI within ANDSF", 3GPP Draft, S2-141831_OPI_CR, vol. SA WG2, XP050805182, May 19, 2014, 4 pages.
International Search Report and Written Opinion in counterpart International Application No. PCT/US2021/047715, mailed Dec. 21, 2021, 18 pages.
"Local Breakout," Science Direct, https://www.sciencedirect.com/topics/engineering/local-breakout, retrieved May 27, 2022, 23 pages.
"3rd Generation Partnership Project; Technical Specification Group Services and System Aspects; System architecture for the 5G System (5GS); Stage 2 (Release 17)," 3GPP TS 23.501 V17.5.0, Jun. 2022, 568 pages.
"3rd Generation Partnership Project; Technical Specification Group Core Network and Terminals; Numbering, addressing and identification; (Release 17)," 3GPP TS 23.003 V17.6.0, Jun. 2022, 147 pages.
"Draft RRC CR: Non-Public Network enhancements," 3GPP TSG-RAN WG2 Meeting #116 Electronic, Nokia, Nokia Shanghai Bell, R2-2111399, R2-2110365, CR38.331, Version: 16.6.0 Nov. 1-12, 2021, 22 pages.
"Draft Stage 2 CR: Non-Public Network enhancements," 3GPP TSG-RAN WG2 Meeting #116 Electronic, Nokia, Nokia Shanghai Bell, R2-2111398, R2-2110364, CR38.300, Version: 16.7.0, Nov. 1-12, 2021, 13 pages.
"Adding a priority bit into the Access Technology Identifier," 3GPP TSG-CT WG6 Meeting #89, C6-180215, CR31.102, Version 15.0.0, May 21-25, 2018, 4 pages.
Non-Final Office Action for U.S. Appl. No. 17/315,581, filed Oct. 5, 2022, 13 pages.

* cited by examiner

CSG-ID EXAMPLE FORMAT
200

| OCTET 0 | | OCTET 1 | | OCTET 2 | | OCTET 3 | |
|---|---|---|---|---|---|---|---|
| 0-9/A-F | 0-9/A-F | 0-9/A-F | 0-9/A-F | 0-9/A-F | 0-9/A-F | 0-9/A-F | 0-9/A-F |
| B7 B6 B5 B4 | B3 B2 B1 B0 | B7 B6 B5 B4 | B3 B2 B1 B0 | B7 B6 B5 B4 | B3 B2 B1 B0 | B7 B6 B5 | |

B7/OCTET0 = MSB
B5/OCTET3 = LSB

FIG. 2A

NiD EXAMPLE FORMAT
220

| OCTET 0 | | OCTET 1 | | OCTET 2 | | OCTET 3 | | OCTET 4 | |
|---|---|---|---|---|---|---|---|---|---|
| 0-9/A-F | 0-9/A-F | 0-9/A-F | 0-9/A-F | 0-9/A-F | 0-9/A-F | 0-9/A-F | 0-9/A-F | 0-9/A-F | 0-9/A-F |
| B7 B6 B5 B4 | B3 B2 B1 B0 | B7 B6 B5 B4 | B3 B2 B1 B0 | B7 B6 B5 B4 | B3 B2 B1 B0 | B7 B6 B5 B4 | B3 B2 B1 B0 | B7 B6 B5 B4 | B3 B2 B1 B0 |

B7/OCTET0 = MSB
B0/OCTET4 = LSB

FIG. 2B

3GPP BROADCASTING ID EXAMPLE ENCODING FORMAT 240

| | | |
|---|---|---|
| OCT0/B7 | ANY IDENTITY TYPE | |
| OCT0/B6 | A SERVICE PROVIDER IDENTITY | |
| OCT0/B5 | A CLOUD PROVIDER IDENTITY | |
| OCT0/B4 | A GENERIC ENTERPRISE IDENTITY | |
| OCT0/B3 | A GOVERNMENT IDENTITY | |
| OCT0/B2 | AN AUTOMOTIVE IDENTITY | |
| OCT0/B1 | A HOSPITALITY IDENTITY | |
| OCT0/B0 | AN AVIATION INDUSTRY IDENTITY | |
| OCT1/B7 | AN EDUCATION OR RESEARCH IDENTITY | |
| OCT1/B6 | BASELINE ID POLICY APPLIES | |
| OCT1/B5 | A PERMANENT ID WILL BE RETURNED BY THE IDP | |
| OCT1/B4 | BASELINE QOS | |
| OCT1/B3 | SILVER QOS | |
| OCT1/B2 | GOLD QOS | |
| OCT1/B1 | HOME_ROUTED (0), LIPA_ONLY (1) | |
| OCT1/B0 | RESERVED SET TO 0 | |
| OCT2/B7 | RESERVED SET TO 0 | |
| OCT2/B6 | RESERVED SET TO 0 | |
| OCT2/B5 | RESERVED SET TO 0 | |
| OCT2/B4 | RESERVED SET TO 0 | |
| OCT2/B3 | RESERVED SET TO 0 | |
| OCT2/B2 | RESERVED SET TO 0 | |
| OCT2/B1 | RESERVED SET TO 0 | |
| OCT2/B0 | RESERVED SET TO 0 | |
| OCT3/B7 | RESERVED SET TO 0 | |
| OCT3/B6 | RESERVED SET TO 0 | |
| OCT3/B5 | RESERVED SET TO 0 | |

FIG.2C

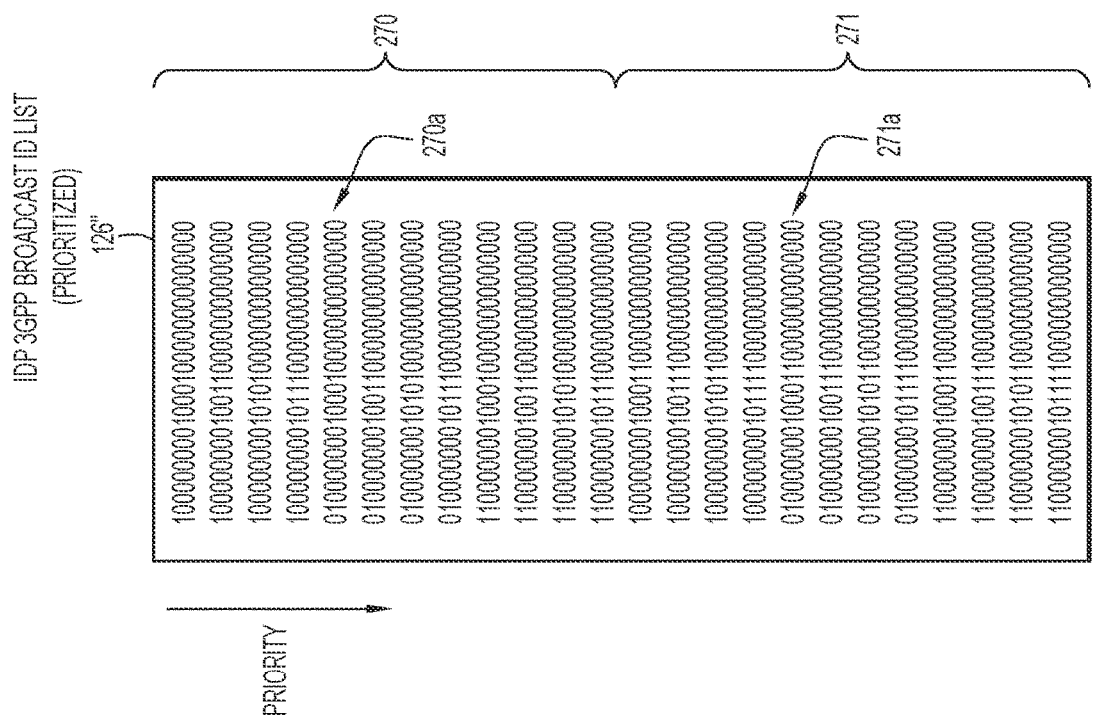

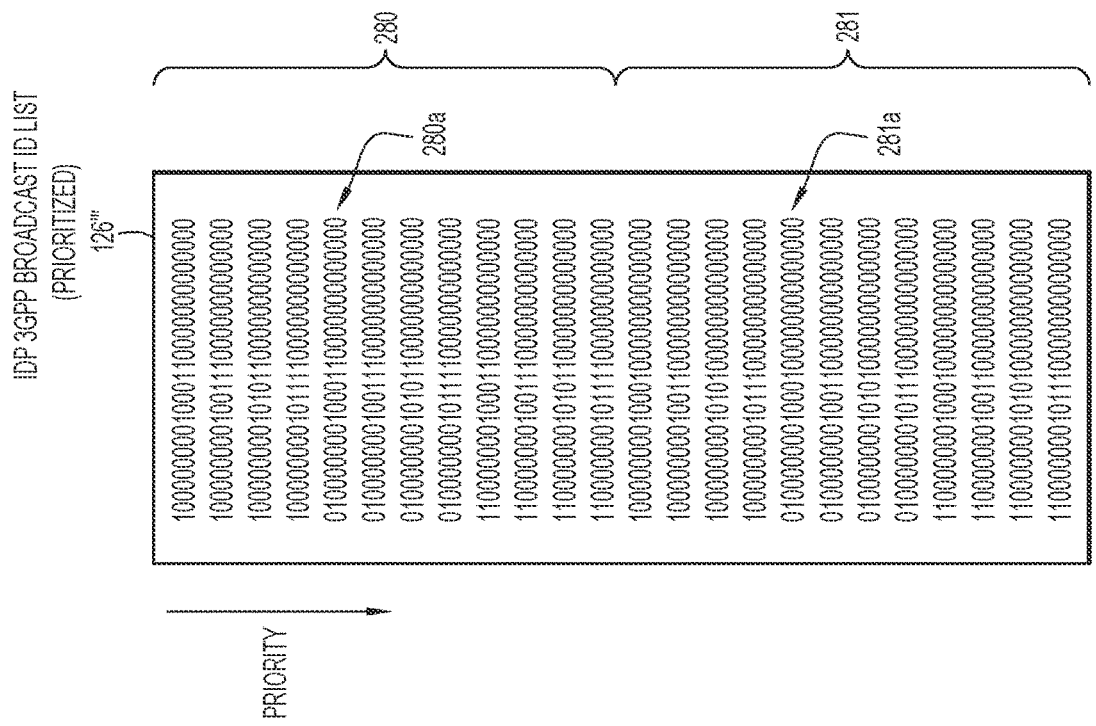

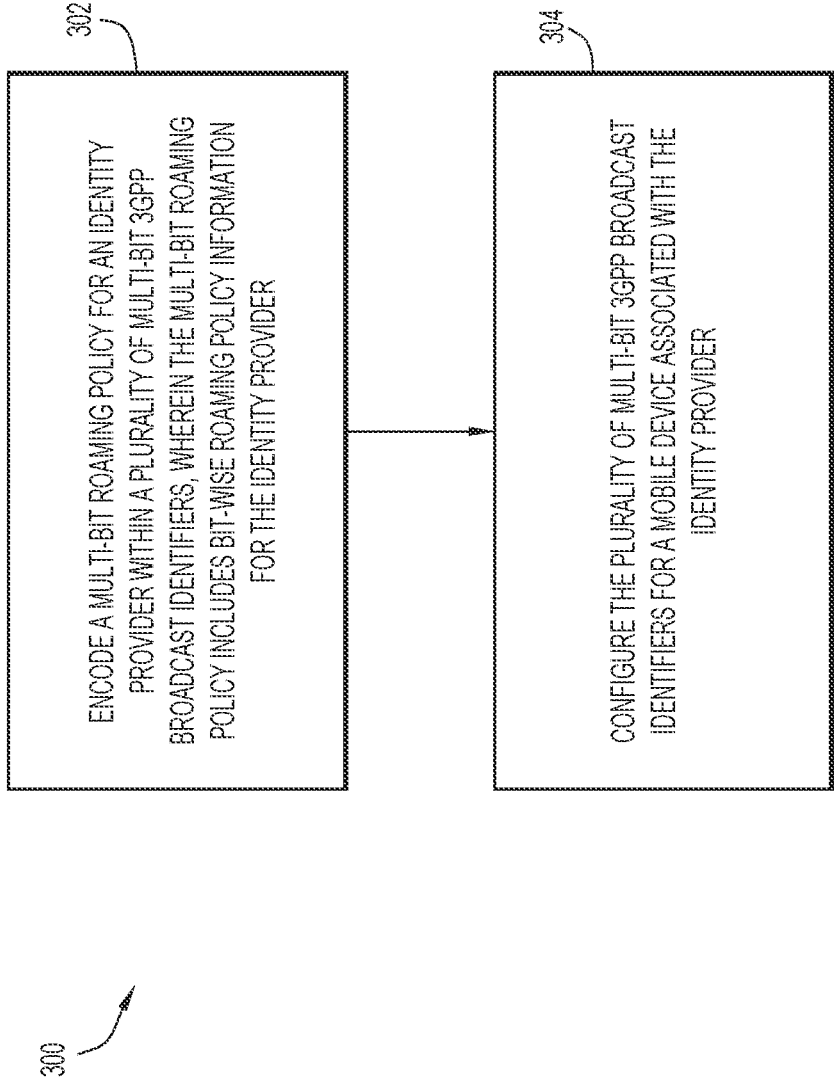

US 12,262,446 B2

PROVIDING A ROAMING POLICY FEDERATION IN A THIRD GENERATION PARTNERSHIP PROJECT (3GPP) NETWORK ENVIRONMENT

PRIORITY CLAIM

This application is a continuation-in-part of and claims the benefit of priority to U.S. patent application Ser. No. 17/315,581, filed May 10, 2021, which application claims the benefit of priority under 35 U.S.C. § 119 to U.S. Provisional Application No. 63/073,642, filed Sep. 2, 2020, the entirety of which applications are incorporated herein by reference.

TECHNICAL FIELD

The present disclosure relates to network equipment and services.

BACKGROUND

Networking architectures have grown increasingly complex in communications environments, particularly mobile networking environments. OpenRoaming™ has revolutionized Institute of Electrical and Electronics Engineers (IEEE) 802.11 (e.g., Wi-Fi®) roaming. In some instances, it may be useful to extend OpenRoaming™ features to Third Generation Partnership Project-based (3GPP-based) access networks (e.g., cellular networks), however, 3GPP standards do not currently support OpenRoaming™ constructs. Accordingly, there are significant challenges in extending OpenRoaming™ features to 3GPP-based access networks.

BRIEF DESCRIPTION OF THE DRAWINGS

FIGS. 2A, 2B, and 2C are schematic diagrams illustrating example policy mapping details that may be utilized in a roaming policy federation architecture for a 3GPP network environment, according to an example embodiment.

FIGS. 2D and 2E are diagrams illustrating example prioritized IDP 3GPP broadcast identifier/identity lists that can be provisioned in a whitelist for a mobile device, according to example embodiments.

FIG. 3A is a flow chart depicting a method according to an example embodiment.

DETAILED DESCRIPTION

Overview

Figure 1A:
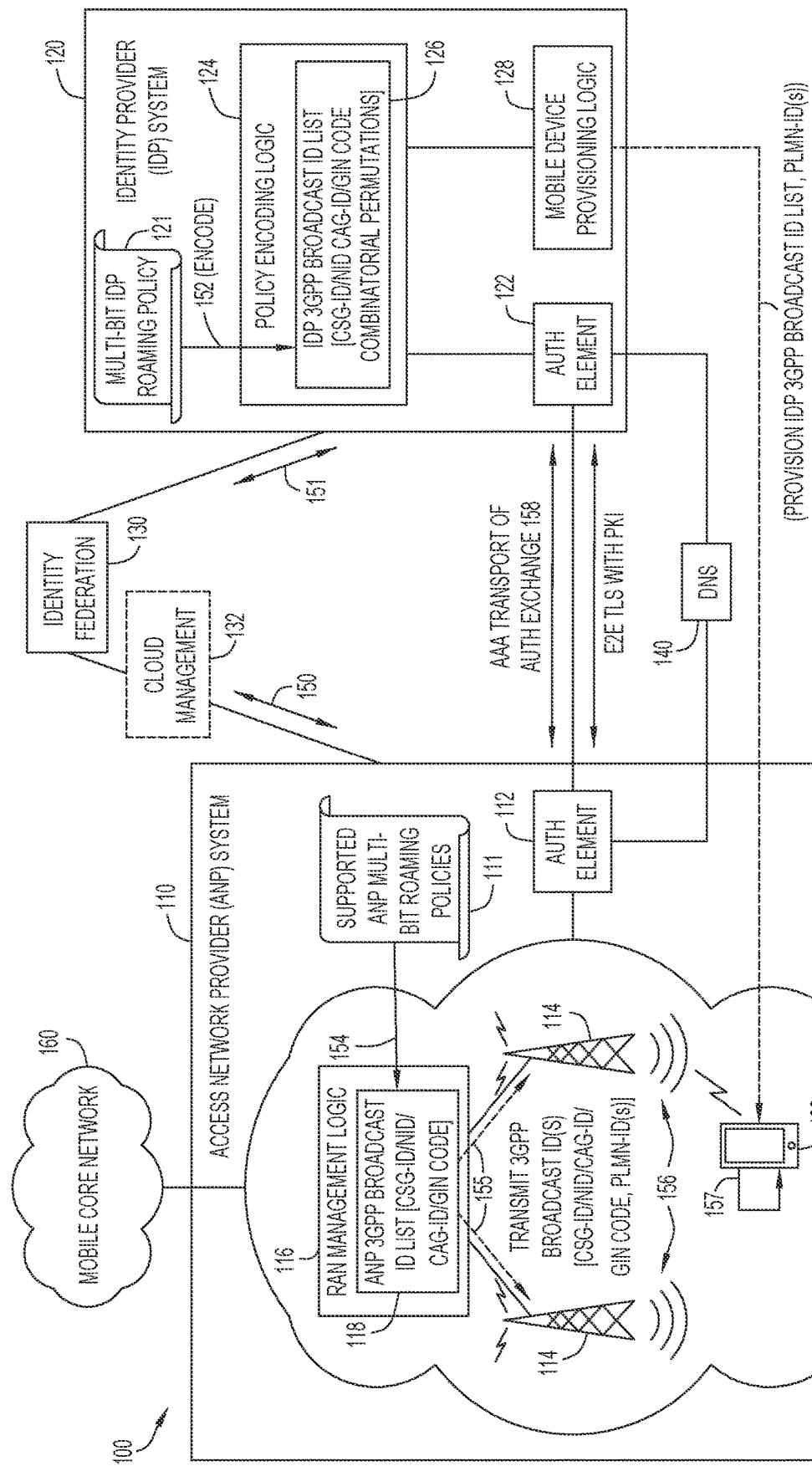
FIG. 1A is a diagram of a system in which techniques that facilitate providing a roaming policy federation architecture for a Third Generation Partnership Project (3GPP) network environment may be implemented, according to an example embodiment.

Techniques presented herein may be associated with replicating an OpenRoaming™ policy federation in a Third Generation Partnership Project (3GPP) network environment. In particular, techniques presented herein provide a roaming policy federation architecture for a 3GPP network environment. In one example, a system and method may be defined to allow for features that are typically associated with OpenRoaming's policy enablement to be realized for 3GPP networks using a combination of multi-bit 3GPP broadcast identifiers and user equipment (UE) provisioned identifiers that can represent multi-bit roaming policies for identity providers and for access network providers. OpenRoaming™ is a registered trademark of the Wireless Broadband Alliance (WBA).

In at least one embodiment, a computer-implemented method is provided that may include encoding a multi-bit roaming policy for an identity provider within a plurality of multi-bit 3GPP broadcast identifiers in which the multi-bit roaming policy includes bit-wise roaming policy information for the identity provider. The method may further include configuring the plurality of multi-bit 3GPP broadcast identifiers for a mobile device associated with the identity provider. In one instance, detecting, by the mobile device, at least one multi-bit 3GPP broadcast identifier of the plurality of multi-bit broadcasting identifiers being broadcast by a visited radio access network triggers the mobile device to perform an authentication with the identity provider.

In one instance, one or more of the plurality of multi-bit 3GPP broadcast identifiers may be encoded as one or more Closed Subscriber Group Identities (CSG-IDs) that may be utilized to support 3GPP pre-Release 16 equipment. In one instance, one or more of the plurality of multi-bit 3GPP broadcast identifiers may be encoded as one or more Network Identifiers (NIDs), sometimes referred to as NID Identities (NID-IDs), which may be utilized to support 3GPP Release 16 (R16) or later equipment. In one instance, one or more of the plurality of multi-bit 3GPP broadcast identifiers may be encoded as one or more closed access group identifiers (CAG-IDs). In one instance, the plurality of multibit 3GPP broadcast identifiers may be encoded as one or more Group Identifier for Network selection (GIN) codes. In one instance, the multi-bit roaming policy for the identity provider may be a Roaming Consortium Organizational Identifier (RCOI).

In at least one embodiment, a computer-implemented method is provided that may include encoding at least one multi-bit roaming policy for an identity provider and a plurality of bit-wise combinatorial permutations of the at least one multi-bit roaming policy within each of a plurality of multi-bit Third Generational Partnership Project (3GPP) broadcast identifiers, wherein the at least one multi-bit roaming policy includes bit-wise roaming policy information for the identity provider; and provisioning the plurality of multi-bit 3GPP broadcast identifiers for a mobile device associated with the identity provider, wherein the plurality of multi-bit 3GPP broadcast identifiers indicate that the mobile device is to connect to a visited radio access network associated with a local Internet Protocol (IP) access service or a home routed access service. In at least one instance, the plurality of multi-bit 3GPP broadcast identifiers are one of: a plurality of closed subscriber group (CSG) identifiers; a plurality of network identifiers (NIDs); a plurality of closed access group (CAG) identifiers; or a plurality of Group Identifier for Network Selection (GIN) codes.

Example Embodiments

OpenRoaming™ has revolutionized wireless local area (WLA) access network roaming (e.g., Wi-Fi® roaming). One of the key capabilities of the OpenRoaming framework is policy matching that can be performed between an access network provider (ANP) and an identity provider (IdP or IDP) to enable different business models that can be built on top of the OpenRoaming framework.

The policy enablement and signaling provided in an OpenRoaming framework is currently based on Roaming Consortium Organizational Identifiers (RCOIs), with the Wireless Broadband Alliance (WBA) defining how 12-bits of an extended OUI-36 (36-bit Organizationally Unique Identifier (OUI)) are used to encode policy specific information. Multiple RCOIs can be included in a Wi-Fi beacon and/or queried using Access Network Query Protocol (ANQP) to enable a user equipment (UE) (station (STA)) to discover the RCOIs (policies) supported by a particular access network. The IDP will similarly have configured a Wi-Fi Alliance Passpoint® profile in the UE. This profile also contains one or more OUI-36 RCOIs that correspond to the policies supported by a particular IDP. Following standard Passpoint® procedures for a Wi-Fi OpenRoaming framework, a UE will trigger an authentication exchange only if there is a mutually agreed policy (RCOI) between the ANP and an IDP.

There is a desire to extend features associated with OpenRoaming framework to private wireless wide area (WWA) or cellular access networks (e.g., 3GPP Fourth Generation (4G), Fifth Generation (5G), next Generation (nG), etc. networks) to facilitate such policy enablement. However, 3GPP architectures do not utilize RCOIs and, therefore, there is a need to define an architecture that enables policy definition by an IDP and a 3GPP ANP.

By 'private' it is meant that a private WWA access network (e.g., a Citizen Broadband Radio Service (CBRS) access network and/or a 3GPP cellular access network (e.g., a 4G)/Long Term Evolution (LTE), 5G, nG, etc. access network) may provide network connectivity/services to clients (e.g., users/user equipment/devices/etc.) served by a network operator and/or service provider of the private WWA access network, such as an enterprise, an access network provider, etc. In one example, a private WWA access network may be considered to be a network that may be implemented to serve enterprise purposes (e.g., business purposes, government purposes, educational purposes, etc.) for enterprise clients (e.g., enterprise users/user equipment/devices/etc.) in which the private WWA access network may be operated by any combination of traditional public mobile network operators/service providers (e.g., AT&T®, etc.), enterprises network operators/service providers (e.g., Cisco®, etc.), and/or third party network operators/service providers (e.g., neutral host network operators/service providers, cloud service providers, etc.). A private network may also be referred to as a standalone non-public network (SNPN) or a Public Network Integrated Non-Public Network (PNI-NPN), or more generally, a non-public network (NPN) in some instances. Cisco is a registered trademark of Cisco Technology, Inc. AT&T is a registered trademark of AT&T Intellectual Property.

WLA access networks (e.g., Wi-Fi access networks) are conventionally considered NPNs, as they are typically owned/operated by an entity, such as an enterprise entity, in which access to such WLA access networks is typically restricted to enterprise clients (e.g., enterprise employees or, in some instances, guests).

In at least one embodiment, techniques presented herein may facilitate replicating an OpenRoaming policy federation in a 3GPP network environment. In particular, techniques presented herein provide a roaming policy federation architecture for a 3GPP network environment. In one embodiment, a system and method may be defined to allow features that are typically associated with OpenRoaming's policy enablement to be realized for 3GPP networks using a combination of multi-bit 3GPP broadcast identifiers and user equipment (UE)/mobile device provisioned identifiers that can represent multi-bit roaming policies for identity providers and for access network providers. In at least one embodiment, the multi-bit 3GPP broadcast identifiers can be configured for the mobile device in a prioritized order that identifies a preference for the mobile device to connect to an access network based on the prioritized order.

In one instance, one or more of the plurality of multi-bit 3GPP broadcast identifiers may be encoded as one or more Closed Subscriber Group Identities (CSG-IDs) that may be utilized to support 3GPP pre-Release 16 equipment. In one instance, one or more of the plurality of multi-bit 3GPP broadcast identifiers may be encoded as one or more Network Identifier Identities (ND-IDs) and may be used to support 3GPP Release 16 (R16) or later equipment. In one instance, the multi-bit roaming policy for the identity provider may be a Roaming Consortium Organizational Identifier (RCOI). In still one instance, one or more of the plurality of multi-bit 3GPP broadcast identifiers may be encoded as one or more closed access group identifiers (CAG-IDs). In still one instance, one or more of the plurality of multi-bit 3GPP broadcast identifiers may be encoded as one or more Group Identifier for Network selection (GIN) codes.

Figure 1B:
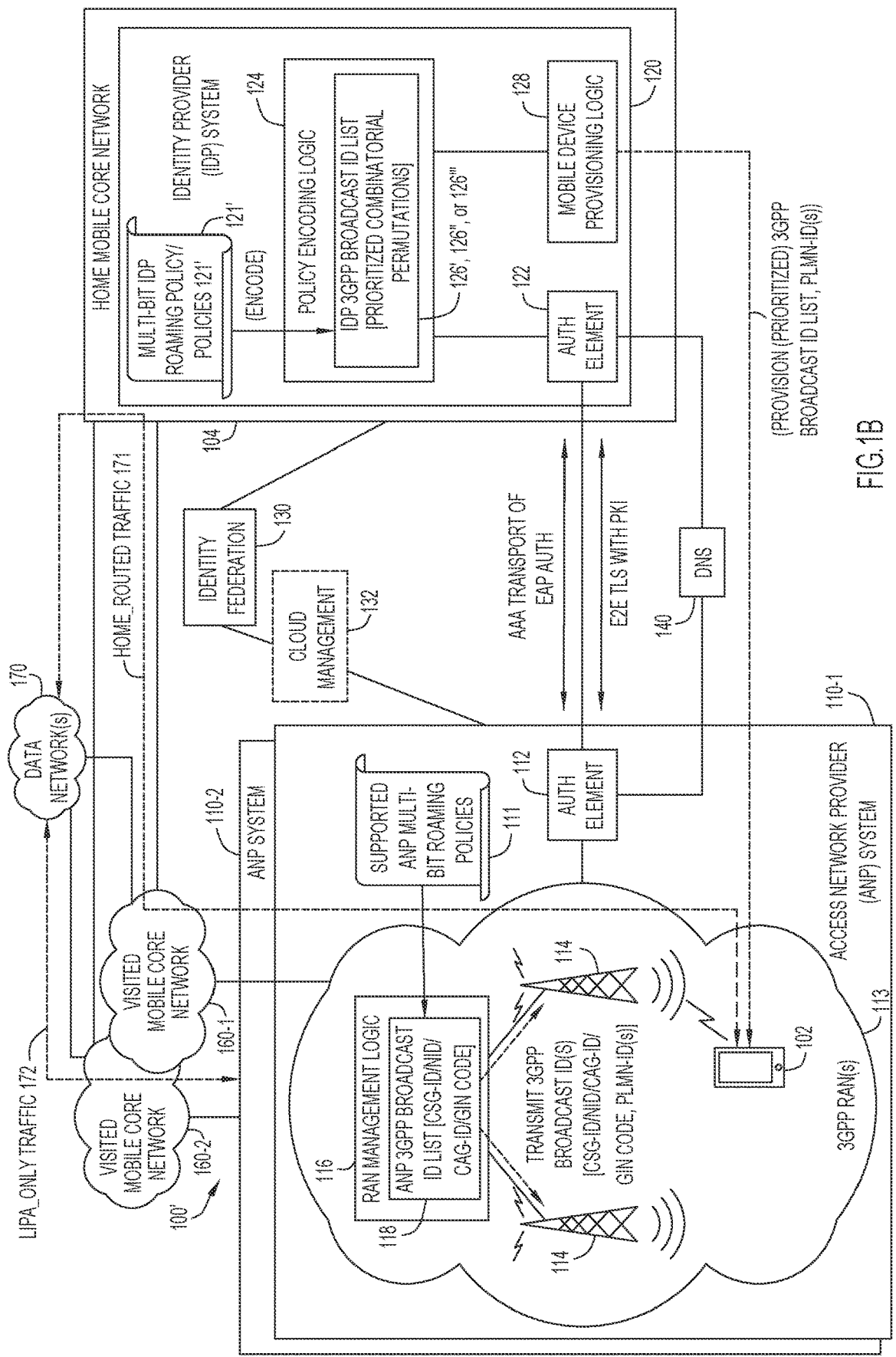
FIG. 1B is a diagram of another system in which techniques that facilitate providing a roaming policy federation architecture for a 3GPP network environment may be implemented, according to an example embodiment.

Referring to FIG. 1A, FIG. 1A a block diagram is shown of a system 100 in which techniques that facilitate providing a roaming policy federation for a 3GPP network environment may be implemented, according to an example embodiment. FIG. 1B, discussed in further detail herein below, is a block diagram of another system 100', which may represent a variation of system 100 of FIG. 1A, in which techniques that facilitate providing a roaming policy federation for a 3GPP network environment may be implemented, according to an example embodiment.

FIGS. 2A, 2B, and 2C are schematic diagrams illustrating example policy mapping details that may be utilized in a roaming policy federation architecture for a 3GPP network environment, according to an example embodiment. FIGS. 2D and 2E are diagrams illustrating example prioritized IDP 3GPP broadcast identifier/identity lists that can be provisioned in a whitelist for a mobile device, according to example embodiments. FIGS. 2A, 2B, 2C, 2D, and 2E are discussed below with reference to FIGS. 1A and 1B.

With reference to FIG. 1A, the system 100 may include an access network provider (ANP) system 110 (also referred to herein interchangeably as 'ANP 110'), an Identity Provider (IDP or IdP) system 120 (also referred to herein interchangeably as 'IDP 120'), an identity federation entity 130, and a Domain Name System (DNS) server 140. A user equipment (UE) or mobile device 102 is also shown in system 100. It is to be understood that any number of mobile devices 102 may be present for the system. Further, although not illustrated in FIG. 1A, it is to be understood that one or more other access network providers may also be present in system 100. In at least one embodiment, a cloud management entity 132 may be provided in system 100. Also shown in FIG. 1A is a mobile core network 160, which can further interface with one or more data network(s) (not shown), such as the Internet, an Internet Protocol (IP) Multimedia Subsystem (IMS), Ethernet network, Ethernet switching system(s), and/or the like.

As illustrated in FIG. 1A, the ANP 110 may include an authentication/authorization (AUTH) element 112 and one or more 3GPP Radio Access Network(s) (RAN(s)) 113 in which the one or more 3GPP RAN(s) may include one or more radio node(s) 114 and RAN management logic 116. Although illustrated external to ANP 110, in some instances, mobile core network 160 may be operated/managed by the ANP 110. The IDP 120 may include an authentication/authorization (AUTH) element 122, policy encoding logic 124, and mobile device provisioning logic 128. In various embodiments, policy encoding logic 124 and mobile device provisioning logic 128 may be configured for one or more computing devices provided for IDP system 120.

Generally, RAN management logic 116 may facilitate configuration and/or management of 3GPP RAN(s) 113/radio nodes 114 and may be implemented as any combination of RAN Element Management System (RAN-EMS), an Open RAN (O-RAN) Alliance Network Management System (NMS), an Operations, Administration and Maintenance (OAM) server, and/or the like. It is to be understood that other elements, functions, logic, etc. may be provisioned for each of the ANP 110 (e.g., to manage the 3GPP RAN(s) 113, to interface with identity federation 130/cloud management entity 132, etc.), the IDP 120 (e.g., to interface with identity federation entity 130, etc.). Within the context of the architecture of FIG. 1A, 3GPP RAN(s) 113 may be characterized as visited access network(s) or visited radio access network(s).

Generally, the identity federation entity 130 may interface with the ANP 110 (potentially via cloud management entity 132) and with the IDP 120. For ANP 110, the radio node(s) 114 may each interface with AUTH element 112 and RAN management logic 116. AUTH element 112 for ANP 110 may further interface with AUTH element 122 for IDP 120. For IDP 120, AUTH element 122 may further interface with policy encoding logic 124, which may further interface with mobile device provisioning logic 128.

In one instance, the ANP 110 may be associated with an access network service provider (SP), which may offer access network services to one or more IDPs to facilitate connectivity for roaming users, such as mobile device 102. In one instance, the IDP 120 may be associated with a service provider (SP), an employer or business, and/or a third-party identity provider with which a user associated with the mobile device may have a subscription, may be an employee of, may be associated with (e.g., via a loyalty program or the like), etc. for services, including roaming services, etc. The IDP 120 may provide authentication services and access decisions (accept, reject, limited access, etc.), identity information, and/or the like for one or more devices, such as the mobile device 102, that may be attempting to connect to one or more of the 3GPP RAN(s) 113 provided by the ANP 110 and/or any other ANPs that may be present within system 100.

In various embodiments, the ANP AUTH element 112 may be implemented as any combinations of an Authentication, Authorization and Accounting (AAA) server, a Diameter Routing Agent (DRA), and/or the like. In various embodiments, the IDP AUTH element 122 may be implemented as any combination of a HSS (e.g., for 4G/LTE), a Policy Control Function (PCF), a Policy and Charging Rules Function (PCRF), a Unified Data Management (UDM) entity/Unified Data Repository (UDR) (e.g., for 5G/nG, an Authentication Server Function (AUSF), an AAA server, and/or the like.

The 3GPP RAN(s) 113 may be inclusive of one or more RAN(s) for one or more Radio Access Technology (RAT) type(s) that may be provided via any combination of with radio nodes 114 [sometimes referred to as access points (APs)], which may include any combination of hardware (e.g., communications units, receiver(s), transmitter(s), antenna(s) and/or antenna array(s), processor(s), memory element(s), baseband processor(s) (modems), etc.), controllers (e.g., wireless local area network controllers, etc.), software, logic, and/or any other elements/entities that may facilitate access network connections for one or more UEs/mobile devices of the system.

In various embodiments, the 3GPP RAN(s) 113 via one or more radio node(s) 114 may provide RAN coverage for any combination of licensed spectrum wireless wide area (WWA) access networks, such as 3GPP access networks (e.g., 4G/LTE, 5G, nG, etc. access networks), unlicensed spectrum 3GPP access networks (e.g., License Assisted Access (LAA), enhanced LAA (eLAA), 5G New Radio (NR) in Unlicensed (5G NR-U), etc. access networks), and/or the like. Thus, radios/access points for the 3GPP access network(s) may include any combination of 4G/LTE evolved Node Bs (eNBs or eNodeBs), 5G/next generation NodeBs (gNBs), APs, and/or any other radio devices now known here or hereafter developed that may facilitate over-the-air Radio Frequency (RF) connections with one or more devices, such as the mobile device 102.

Mobile core network 160 may be configured as any combination of a (private or non-private) 4G/LTE core, typically referred to as the Evolved Packet Core or System (EPC/EPS), 5G core or system (5GC/5GS), nG core or system (e.g., a Sixth Generation (6G) core/system, etc.), and/or the like as may be defined by 3GPP or other similar standards and may include any components, network elements, etc. in order to facilitate operations discussed herein. For example, in one instance for a 5G/nG mobile network core radio nodes 114 may further interface with a 3GPP Access and Mobility Management Function (AMF) within the mobile core network 160 and with one or more 3GPP User Plane Functions (UPFs) within the mobile core network 160. It is to be understood that other network elements may be configured for mobile core network 160 for any combination of 3G/4G/5G/nG implementations, such as, a PCF, a PCRF, an AUSF, a Network Slice Selection Function (NSSF), a Network Repository Function (NRF), a UDM/UDR, a Session Management Function (SMF), an HSS, a Mobility Management Entity (MME), a Serving Gateway (SGW), a Packet Data Network (PDN) Gateway (PGW), any Control and User Plane Separation (CUPS) components, and/or the like in accordance with any 3GPP specifications.

In various embodiments, a mobile device, such as the mobile device 102 shown in FIGS. 1A and 1B, may be associated with any user, subscriber, employee, client, customer, electronic device, etc. wishing to initiate a flow in the system and may be inclusive of any device that initiates a communication in the system, such as a computer, an electronic device such as an industrial device, automation device, enterprise device, appliance, Internet of Things (IoT) device, etc., a laptop or electronic notebook, a cellular/Wi-Fi enabled telephone/smart phone, tablet, etc. and/or any other device, component, element, or object capable of initiating voice, audio, video, media, or data exchanges within the system.

Generally, a DNS server, such a DNS server 140, may provide lookup services for system resources (e.g., hosts, services, functions, etc.) to provide resource records for various DNS queries, such as for discovering one or more IDPs by an ANP. Resource records may include 'A' and 'AAAA' resource records in which 'A' record may define an IP version 4 (IPv4) host address and an 'AAAA' resource record may define an IP version 6 (Ipv6) host address. Resource records may also include Name Service (NS) records (e.g., host.domain.name), canonical name (CNAME) records, Name Authority Pointer (NAPTR) records, service (SRV) records, and/or any other resource record types as may be prescribed at least by any Internet Engineering Task Force (IETF) Request For Comments (RFC) standards, etc. A DNS server, such as DNS server 140, may include resource records for any number of system resources that may be implemented for a system, such as system 100.

Generally, the identity federation entity 130 may be associated with an identity federation network, service, and/or servers. In one embodiment, the identity federation entity 130 may be implemented as an OpenRoaming federation entity. In a typical OpenRoaming architecture, an identity federation may be considered an intermediary service that facilitates interaction with trusted identity providers to allow users/mobile devices to join any access network managed by a federation member. For the roaming policy federation architecture provided by system 100 for the embodiment of FIG. 1A, it may be assumed that the IDP system 120 may provide identity authentication/verification services for one or more users/mobile devices and that the ANP system 110 may be a federation member providing access network services via the 3GPP RAN(s) for one or more users.

Collectively, the identity federation entity 130, the ANP 110, the IDP 120, and various defined multi-bit roaming policies/policy identifiers discussed for embodiments herein (e.g., multi-bit IDP roaming policy 121 may be characterized as belonging to a 'roaming federation'. Although only a single IDP and a single ANP are shown in FIG. 1A, it is to be understood that any number of IDPs 120 may be present within the system and may interface with any number/combination of ANPs 110 and the identity federation entity 130. Thus, multiple ANPs 110 and multiple IDPs 120 can be present within system 100 in accordance with embodiments herein.

Techniques herein may facilitate replicating an OpenRoaming policy federation in the 3GPP network environment as shown in FIG. 1A, via the identity federation entity 130, in order to allow features that are typically associated with OpenRoaming's policy enablement to be realized for 3GPP networks. In particular, techniques herein provide a roaming policy federation architecture for a 3GPP network environment, such as the 3GPP network environment illustrated for system 100, using 3GPP broadcast identifiers (IDs) that can be transmitted by an ANP RAN, such as radio nodes 114 of 3GPP RAN 113 provided by ANP 110, and provisioning 3GPP broadcast identifiers for mobile devices, such as mobile device 102, that can be used by the mobile device 102 to trigger authentication with an IDP, such as IDP 120, upon determining that a 3GPP broadcast identifier being broadcast by the ANP matches one of the 3GPP broadcast identifiers provisioned for the mobile device 102. Thus, 3GPP broadcast ID(s) transmitted by an ANP RAN may represent multi-bit roaming policies that are supported by an ANP, such as ANP 110, in which such ANP-supported policies are illustrated as "supported ANP multi-bit roaming policies 111" in FIG. 1A. Further, 3GPP broadcast ID(s) provisioned by an IDP, such as IDP 120, for a mobile device, such as mobile device 102, may represent a multi-bit roaming policy set by the IDP 120 that is used to trigger authentication of the mobile device 102 with the IDP 120, in which such an IDP roaming policy is illustrated in FIG. 1A as "multi-bit IDP roaming policy 121". 3GPP broadcast IDs transmitted via 3GPP RAN 113/radio nodes 114 of ANP 110 are referred to herein as 'ANP 3GPP broadcast IDs' and 3GPP broadcast IDs provisioned by IDP 120 for a mobile device, such as mobile device 102, are referred to herein as 'IDP 3GPP broadcast IDs'.

It is to be understood that ran nodes 114 will also transmit one or more Public Land Mobile Network Identities (PLMN-IDs). In one embodiment, the identity federation entity 130 (e.g., implemented as an OpenRoaming federation entity) may be assigned one or more E.212 numbers. In one embodiment, the assigned E.212 numbers correspond to a Mobile Country Code (MCC) allocation of 902 which has been allocated by the International Telecommunication Union (ITU) as a shared mobile country code. This may enable the simplification of configuration of equipment across the roaming federation. In at least one embodiment, each of one or more ANPs 110 in the roaming federation associated with identity federation entity 130 may be configured to broadcast (via radio nodes 114) identical one or more PLMN-IDs corresponding to the one or more allocated E.212 numbers. Similarly, the Subscriber Identity Module(s) (SIM(s)) of mobile device 102 may be configured with one or more federation defined E.212 numbers to use when performing network selection. In one embodiment, the defined E.212 numbers can be stored in an elementary file on the SIM designated as storing a Home PLMN (HPLMN) selector with Access Technology information (sometimes referred to as '$EF_{HPLMNwAcT}$').

In one embodiment, an ANP 3GPP broadcast ID transmitted by radio nodes 114 may be a CSG-ID that may be used to support roaming authentication/authorization for 3GPP pre-Release 16 equipment. In another embodiment, ANP 3GPP broadcast ID(s) transmitted by radio nodes 114 may be NID(s)/NID-ID(s), CAG-IDs, and/or GIN codes may be used to support roaming authentication/authorization for 3GPP Release 16 or later equipment.

Consider various example operations that may be associated with the embodiment of FIG. 1A that may facilitate a roaming policy federation for the 3GPP network environment of system 100. In one instance, consider that the identity federation entity 130 include a root Certificate Authority and a Policy Intermediate Certificate Authority (I-CA) and the cloud management entity 132 may act as an Issuing Intermediate Certificate Authority (I-CA).

To enable the roaming policy federation, the ANP 110 and the IDP 120 may perform certificate management operations with the identity federation entity 130, as shown via an operational example at 150 and 151, in order to receive a signed certificate that can be used to secure the interface between the AUTH element 112 of the ANP 110 and the AUTH element 122 of the IDP 120. For example, the operations at 150 may include an on-line signup by the ANP 110 including acceptance of terms and conditions and roaming policies that are to be supported by the ANP 110. The Policy I-CA may issue certificates to the Issuing I-CA in which the cloud management entity 132 includes the Issuing I-CA to enable issuance of Public Key Infrastructure (PKI) certificates to the AUTH element 112 of the ANP 110. A similar arrangement can be used to issue certificates to the AUTH element 122 of the IDP 120 in which the operations at 151 can include an on-line signup including acceptance of terms and conditions and by the IDP 120 and provisioning the IDP certificate for AUTH element 122.

Following certificate provisioning for the ANP 110 and the IDP 120, multi-bit roaming policies can be encoded into 3GPP broadcast ID(s) for each of the ANP 110 (ANP 3GPP broadcast ID(s)) and the IDP 120 (IDP 3GPP broadcast ID(s)). Recall that the WBA-defined RCOI policy extension can be used to encode policy specific information within each bit of a multi-bit RCOI; however, 3GPP architectures do not currently utilize RCOIs.

In accordance with embodiments herein, a mapping or encoding may be provided between the WBA-defined RCOI policy extension and a 3GPP multi-bit broadcast ID (e.g., CSG-ID, NID/NID-ID, CAG-ID, and/or GIN code) via a number of bits used to indicate an RCOI or roaming extended policy that may be used across a roaming federation, such as the roaming federation involving identity federation entity 130, ANP 110, and IDP 120 of FIG. 1A. Also defined for techniques herein are two federation-wide PLMN-IDs that represent the equivalent 24-bit RCOIs defined in OpenRoaming. These PLMN-IDs can be used to indicate whether an access network, such as 3GPP RAN(s) 113, supports a 'settlement-free-access' and/or a 'settled-access', and whether an IDP 120 authorizes mobile devices 102 to access with either settlement-free and/or settled service, which can be used to replace the 24-bit RCOIs defined in OpenRoaming. In this way, even though all ANPs 110 in the identity federation entity 130 are configured with one or more commonly defined PLMN-IDs, and all devices 102 in the identity federation entity 130 are configured with one or more commonly defined PLMN-IDs, the multi-bit RCOI/roaming policy can be used to selective trigger only a subset of mobile devices 102 to authenticate to an individual ANP 110 where there is at least one policy in common between the ANP 110 and IDP 120. Generally, a settled/non-settled access allows simplification in the architecture whereby for a settlement-free-access there is no data clearing, fraud, and financial clearing involved that would otherwise be involved for a settled-access.

The PLMN-IDs defined in accordance with techniques herein may allow normal network selection to be performed. In a conventional use case, the "home network" PLMN-ID will correspond to the first 5/6 digits of the International Mobile Subscriber Identity (IMSI)/E.212 number in any combination of an Embedded Universal Integrated Circuit Card (eUICC), Subscriber Identity Module (SIM) (sometimes referred to as Subscriber Identification Module) card, and/or embedded SIM (eSIM). In a preferred embodiment, one or more PLMN-IDs can additionally be identified as corresponding to the "home network" by the use of an ordered list stored in an elementary file in any combination of an Embedded Universal Integrated Circuit Card (eUICC), SIM card, and/or embedded SIM (eSIM). Hence, a mobile device 102 can use these one or more PLMN-IDs to preferentially search for its "home network". A similar approach is provided by techniques herein, now with the PLMN-IDs representing the "federation" in which mobile devices, such as mobile device 102, can search out networks that broadcast the identity of the federation using one or both of the settled/settlement-free PLMN-ID(s).

Instead of defining multiple RCOIs, a 3GPP network environment may utilize a bitmap to define multi-bit 3GPP roaming policies that can be used to trigger authentication between a roaming mobile device 102 and a particular IDP 120. In one example referring to FIG. 2A, FIG. 2A is a schematic diagram illustrating a CSG-ID example format 200 for a 27-bit CSG-ID that is 4 octets in length in which bit-7 (B7) of Octet 0 is the most significant bit (MSB) and bit-5 of Octet 3 is the least significant bit (LSB). The CSG-ID mapping/encoding can also be extended to a NID/NID-ID, which is 10 hexadecimal digits. For example, referring to FIG. 2B, FIG. 2B is a schematic diagram illustrating an example NID/NID-ID example format 220 for a 10 hexadecimal digit NID that is 5 octets in length in which bit-7 (B7) of Octet 0 is the MSB and bit-0 (B0) of Octet 4 is the LSB. In another example, multi-bit 3GPP roaming policies can also be mapped/encoded into 3GPP 32-bit CAG-IDs, which can be organized in a similar octet/bit format as discussed herein for various CSG-ID/NID/NID-ID formats. In another example, multi-bit 3GPP roaming policies can also be mapped/encoded into 3GPP 32-bit CAG-IDs, which can be organized in a similar octet/bit format as discussed herein for various CSG-ID/NID/NID-ID formats. In one instance, a GIN code can be encoded as an SNPN identifier that is a combination of a PLMN-ID and a NID/NID-ID.

A 3GPP broadcast ID example encoding format 240 is shown in FIG. 2C in which each bit for the encoding format 240 may be used to encode policy specific information for a multi-bit roaming policy (e.g., multi-bit IDP roaming policy 121 for IDP 120 or supported ANP multi-bit roaming policies 111 for ANP 110). For example, policy specific identity information 242 can be encoded into one or more bits of a multi-bit 3GPP broadcast ID and can be used to indicate, for an IDP, the identity type(s) (e.g., any type, SP identity, cloud provider identity, etc.) that the IDP uses to perform authentication for a mobile device. For an ANP, the policy specific identity information 242 can be used to indicate identity type(s) supported by the ANP for authentication with an IDP. Further, identity (ID) policy information 243 can be encoded to indicate whether identity information a baseline ID policy is to be applied such that identities are to be kept private (e.g., all users are to be anonymous) or whether a permanent ID will be returned by the IDP. Further, Quality of Service (QoS) information, such as a baseline or 'bronze' QoS 244, a mid-level or 'silver' QoS 245, and/or a top-level or 'gold' QoS 246 can be used to indicate, for an IDP, service level(s) sought by the IDP for service by an ANP and can be used to indicate, for an ANP, service level(s) supported by the ANP. It is to be understood that the example policy specific information illustrated in FIG. 2C is not meant to limit the broad scope of the present disclosure. In various embodiments, any other policy information may be provided in any encoding format as discussed, for example, with reference to FIG. 1B, below.

During operation following the certificate provisioning at 151, the IDP 120 is responsible for provisioning the multi-bit IDP roaming policy 121 for mobile device 102. The provisioning may include, as shown at 152, encoding the multi-bit IDP roaming policy 121 via policy encoding logic 124 into one or more multi-bit 3GPP-based broadcast identities/identifiers (IDs) to generate an IDP 3GPP broadcast ID list 126. The IDP 3GPP broadcast ID list 126 can include any combination of multi-bit encoded CSG-IDs, NIDs/NID-IDs, CAG-IDs, and/or GIN codes that can be used to trigger authentication of a mobile device. Following generation of the IDP 3GPP broadcast ID list 126, one or more multi-bit 3GPP broadcast ID(s) can be provisioned 153 in a whitelist of multi-bit 3GPP broadcast ID(s) for mobile device 102 via mobile device provisioning logic 128. In some instances, one or more home-network PLMN-IDs can also be provisioned in the SIM card of the mobile device 102 via mobile device provisioning logic 128. The home-network PLMN-IDs can be provisioned within an IMSI provisioned for the mobile device 102 or within any other elementary file provisioned in any combination of an Embedded Universal Integrated Circuit Card (eUICC), SIM card, and/or embedded SIM (eSIM) used by mobile device 102.

Consider an operational example in which IDP 120 is a service provider (SP) and defines or configures the multi-bit IDP roaming policy 121 in which authentication with the IDP 120 involves a service provider identity, a minimum QoS of a gold QoS, and privacy (baseline ID policy applies) such that the multi-bit IDP roaming policy can be encoded into a multi-bit 3GPP broadcast identifier as '11000000010001' for a CSG-ID, assuming padding with zeros to the Octet 3 nibble boundary (i.e., '11000000010001000000000000') which is equivalent to '0xC044000' or NIDs/NID-IDs were to be used, an equivalent mapping for a 10-hexadecimal digit NID/NID-ID would be '0xC044000000'. In some instances, CAG-IDs and/or GIN codes could be used/encoded in a similar manner.

For the CSG-ID for the present example, Oct0/B7 can be set to '1' as an ANP that supports any combination of a service provider identity, a cloud provider identity, a generic identity, a government identity, an automotive identity (e.g., association with an automotive manufacturer, etc.), a hospitality identity (e.g., a hotel/lodging/etc. reward/loyalty program/affiliation), an aviation industry identity (e.g., airline reward/loyalty program/affiliation), and/or an education or research identity may choose to broadcast support for the 'any identity type' as opposed to broadcasting each individual identity type supported. Thus, the Oct0/B7 CSG-ID may be set to '1' along with the IDP's policy of a service provider identity (Oct0/B6) also set to '1'. Further, the baseline privacy ID policy applies such that Oct1/B6 is set to '1' and the gold QoS service level (Oct1/B2) is also set to '1').

For generating the IDP 3GPP broadcast ID list 126, IDP 120 is to ensure that all combinatorial permutations are defined/encoded according to the IDP's multi-bit roaming policy. For the above example multi-bit IDP roaming policy CSG-ID encoding involving a service provider ID, a minimum QoS of a gold QoS, and privacy, two "top level" combinatorial permutations (assuming zero paddings to the nibble boundary, as noted above) may include:

10000000010001000000000000 equivalent to 0x8044000 (covering a potential permutation involving: any ID, baseline ID policy, and gold QoS)
01000000010001000000000000 equivalent to 0x4044000 (covering a potential permutation involving: SP ID, baseline ID policy, and gold QoS)

From the QoS perspective, since the IDP 120 policy is for the gold QoS, the IDP 120 will further permit operation if an ANP supports any combination of the gold QoS, the gold and silver QoS, the gold and the bronze QoS, or the gold, silver, and bronze QoS (e.g., any potential permutation in which the gold QoS is supported). Thus, additional combinatorial permutations may be configured as follows (note, duplicate permutations are not shown):

10000000010011000000000000 equivalent to 0x804C000 (covering a potential permutation involving: any ID, baseline ID policy, silver QoS, and gold QoS)
10000000010101000000000000 equivalent to 0x8054000 (covering a potential permutation involving: any ID, baseline ID policy, bronze QoS, and gold QoS)
10000000010111000000000000 equivalent to 0x805C000 (covering a potential permutation involving: any ID, baseline ID policy, bronze QoS, silver QoS, and gold QoS)
01000000010011000000000000 equivalent to 0x404C000 (covering a potential permutation involving: SP ID, baseline ID policy, silver QoS, and gold QoS)
01000000010101000000000000 equivalent to 0x4054000 (covering a potential permutation involving: SP ID, baseline ID policy, bronze QoS, and gold QoS)
01000000010111000000000000 equivalent to 0x405C000 (covering a potential permutation involving: SP ID, baseline ID policy, bronze QoS, silver QoS, and gold QoS)
11000000010011000000000000 equivalent to 0xC04C000 (covering a potential permutation involving: any ID, SP ID, baseline ID policy, silver QoS, and gold QoS)
11000000010101000000000000 equivalent to 0xC054000 (covering a potential permutation involving: any ID, SP ID, baseline ID policy, bronze QoS, and gold QoS)
11000000010111000000000000 equivalent to 0xC05C000 (covering a potential permutation involving: any ID, SP ID, baseline ID policy, bronze QoS, silver QoS, and gold QoS)

Thus, for the present example, the 3GPP broadcast ID list 126 may include 12 total CSG-ID combinatorial permutations to support 3GPP pre-release 16 mobile devices and, potentially, 12 total NID/NID-ID, CAG-ID, and/or GIN code combinatorial permutations to support 3GPP Release 16 or later mobile devices.

Upon generating the IDP 3GPP broadcast ID list 126 including the CSG-ID (and potentially NID/NID-ID, CAG-ID, and/or GIN code) combinatorial permutations (e.g., multiple multi-bit IDP 3GPP broadcast identifiers), the IDP 120 provisions/configures the plurality of the multi-bit IDP 3GPP broadcast IDs included in the list for mobile device 102, as shown at 153. For instances in which the mobile device 102 is a 3GPP pre-Release 16 UE, the multi-bit IDP 3GPP broadcast identifiers of the list are CSG-IDs provisioned for the mobile device. For instances in which the mobile device 102 is at least a 3GPP Release 16 mobile device, the multi-bit IDP 3GPP broadcast identifiers of the list are NIDs/NID-IDs, CAG-IDs, and/or GIN codes provisioned for the mobile device. Combinatorial permutations of a given NID/NID-ID, CAG-ID, and/or GIN code or multiple NIDs/NID-IDs, CAG-IDs, and/or GIN codes can be configured in a similar manners as multiple CSG-IDs for instances in which either a single NID/NID-ID, CAG-ID, and/or GIN code may be broadcast or up to 12 NIDs/NID-IDs, CAG-IDs, and/or GIN codes may be broadcast.

In various embodiments, the provisioning at 153 may be configured when the mobile device 102 is associated or otherwise onboarded to the IDP (e.g., by subscribing to services provided by the IDP 120, when joining a loyalty/reward program/etc. associated with the IDP 120, during onboarding when mobile device 102 is owned or leased by IDP 120 that is an enterprise entity, etc.), at the time of manufacture of mobile device 102 (e.g., if IDP 120 is an equipment manufacturer), combinations thereof, and/or the like. The provisioning at 153 may be performed over any combination of wired and/or wireless accesses. In some embodiments, provisioning logic 128 may be implemented via a Global System for Mobile Communications Association (GSMA) Subscription Manager-Data Preparation (SM-DP) element in which the list (whitelist) of multi-bit IDP 3GPP broadcast IDs can be provisioned for mobile device 102 via the GSMA standards-based SM-DP+ interface into any combination of an Embedded Universal Integrated Circuit Card (eUICC), SIM card, and/or embedded SIM (eSIM) for mobile device 102. In other embodiments, provisioning logic 128 may be implemented via a SIM Over The Air (OTA) element in which list (whitelist) of multi-bit IDP 3GPP broadcast IDs can be provisioned for mobile device 102 via embedding in a Short Message Service (SMS) message sent to the SIM card for mobile device 102. In some embodiments, the provisioning may include provisioning the list (whitelist) of multi-bit IDP 3GPP broadcast IDs in any combination of memory element(s)/storage configured for mobile device 102.

The provisioning/configuring at 153 may also include provisioning one or more PLMN-ID(s) for mobile device 102 to indicate whether the mobile can seek attachment to a 'settlement-free' access and/or 'settled-access'. The provisioning/configuring of one or more preferred PLMN-IDs is performed when an IMSI is allocated for a mobile device 102. For example, the IDP 120 can provision an identity (e.g., IMSI) for mobile device 102 that includes a PLMN-ID where a Mobile Country Code (MCC) of '902' is used to indicate a shared access and a Mobile Network Code (MNC) of '02' (if a 2-digit MNC is used) or '002' (if a 3-digit MNC is used) is used to indicate that the mobile device may seek connection to a shared settlement-free access, such that the PLMN-ID may be set to '90202' (5-digits total for a 2-digit MNC) or '902002' (6-digits total for a 3-digit MNC). The IDP 120 can also provision an identity for mobile device 102 including a PLMN-ID where an MCC of '902' and a MNC of '03' or '003' is used to indicate that the mobile device may seek connection to a shared settled-access (under certain conditions, as discussed below), such that the PLMN-ID may be set to '90203' or '902003'. In some embodiments, scaling can be enhanced by the IDP 120 configuring an elementary file in any combination of an eUICC, SIM card, and/or eSIM to include the one or more PLMN-IDs to be used by mobile device 102 during network selection when searching for home networks. In this way, the PLMN-ID embedded within the IMSI of mobile device 102 is permitted to be distinct from the PLMN-IDs operated across the identity federation.

Further, as shown at 154, the ANP 110, via RAN management logic 116, can provision an ANP 3GPP broadcast ID list 118 that indicates supported ANP multi-bit roaming policies 111 that the ANP 110 intends to support for the 3GPP network environment. The ANP 3GPP broadcast ID list 118 can include multi-bit roaming policies such as a CSG-ID and/or one or more NID(s)/NID-ID(s), CAG-ID(s), and/or GIN(s) code that can be further provisioned/configured, at shown at 155, for radio nodes 114 such that the radio nodes 114 can transmit or broadcast the CGS-ID and/or one or more NID(s)/NID-ID(s), CAG-ID(s), and/or GIN code(s), as shown at 156.

For the present operational example involving mobile device 102, consider that ANP 110 only accepts SP identities, accepts private users, and supports the gold QoS, such that a multi-bit broadcast identifier encoded as a CSG-ID set to '01000000010001' (assuming zero paddings to the nibble boundary such that the full 27-bit CSG-ID is set to '010000000100010000000000000').

Additionally in this example, at 155, ANP 110 provisions one or more PLMN-IDs for the radio nodes 114 to broadcast the one or more PLMN-IDs, for example, indicating that the access network is a 'settled-access' (e.g., PLMN-ID set to '90203' (for a 2-digit MNC) or '902003' (for a 3-digit MNC)), that the access network supports only a 'settlement-free access' (e.g., PLMN-ID set to '90202' (for a 2-digit MNC) or '902002' (for a 3-digit MNC), or that the access network supports both 'settled-access' and 'settlement-free access' (e.g., PLMN-ID set to '90202' and equivalent PLMN-ID set to '90203' (for a 2-dgit MNC)). The PLMN-ID(s) can also be transmitted by radio nodes 114, as shown at 156.

Although the present operational example is considered with reference to legacy equipment, it is to be understood that the same techniques can be used with a NID/NID-ID/CAG-ID/GIN code, as defined herein, to also provide support for SNPN identifiers in 3GPP Release 16 or later equipment. Note, the NID/NID-ID definition in 3GPP Release 16 assumes that SNPNs are 'intended for the sole use of a private entity,' which may not be the case in applying roaming federation concepts to private 5G/nG networks.

For the present operational example, consider that mobile device 102 is a legacy (pre-Release 16) mobile device in which multi-bit roaming policies encoded as CSG-IDs may be utilized. Thus, in this example, the provisioning at 153 can include all the CSG-ID combinatorial permutations, as discussed above.

From the mobile device (station or STA) perspective, a whitelist of the permitted CSG-IDs can be configured in the mobile device 102 at 153. However, in contrast to RCOI usage in a Wi-Fi OpenRoaming environment, 3GPP cells/radio nodes, such as radio nodes 114, are only able to broadcast a single CSG-ID in the first System Information Block (SIB-1) SIB-1 transmission of a 3GPP broadcast transmission.

Thus, for the present example, upon obtaining a SIB-1 transmission from a radio node 114 containing the ANP CSG-ID, the mobile device 102, as shown at 157, after successfully searching and identifying a PLMN-ID within the SIB-1 transmission that matches a PLMN-ID provisioned for the mobile device 102 (at 153), the mobile device 102 will perform bit-wise matching between the broadcast CSG-ID its own provisioned whitelist of CSG-IDs and may trigger an authentication onto the ANP 110 3GPP RAN 113 if there is a match to the whitelist (including the various combinatorial permutations) provisioned for the mobile device 102. Thus, if there is a match in list the CSG-IDs, this means that there is at least one policy common between the ANP 110 and the IDP 120, which triggers the mobile device 102 to attempt authentication onto the ANP 110 via authentication with the IDP 120. For this example, a match would exist between the broadcast CSG-ID and the combinatorial permutation '01000000010001' equivalent to 0x4044000, as discussed above.

In at least one instance, triggering an authentication by the mobile device 102 can include the ANP 110 performing IDP 120 discovery via the DNS server 140 (assuming the IDP 120 has pre-configured the DNS server 140 with information (e.g., IP address, domain name, etc.) to determine the IP address, domain, etc. for IDP 120. Following IDP 120 discovery, end-to-end E2E Transport Layer Security (TLS) can be established between the ANP 110 and the IDP 120 via the PKI certificates provisioned at 150/151, and an AAA transport for authentication signaling via ANP AUTH element 112 and IDP AUTH element 122 can be utilized, as shown at 158, to facilitate authentication between the mobile device 102 and the IDP 120. In various embodiments, the authentication exchange can include an Extensible Authentication Protocol (EAP) authentication exchange, such as EAP Authentication and Key Agreement (EAP-AKA), Evolved Packet System EAP (EPS-EAP), and/or the like. In various embodiments, the AAA transport can utilize Remote Authentication Dial-In User Service (RADIUS) protocol communications and/or Diameter protocol communication (e.g., for a 3GPP Sha-based Diameter EAP application). Upon successful authentication between mobile device 102 and IDP 120, the mobile device 102 can complete attachment to the 3GPP RAN 113 via one or more of radio node(s) 114 for connection to mobile core network 160.

However, if there is no match between the multi-bit IDP 3GPP broadcast IDs provisioned by the IDP 120 for mobile device 102, the mobile device 102 will not trigger authentication onto the ANP 110 3GPP RAN 113. For example, if the mobile device 102 is provisioned with a multi-bit roaming policy corresponding to an enterprise ID, then its CSG-ID could be configured as '10010000100xx', which would not match the ANP 110 CSG-ID broadcast at 156 and the mobile device 102 would therefore not trigger authentication onto the ANP 110 3GPP RAN 113.

It should be noted that there are key differences when using a CSG-ID and a NID/NID-ID or CAG-ID. For example, with a CSG-ID, a single CSG ID is broadcast, but the mobile device is provisioned with the combinatorial combinations. However, with NID, as per 3GPP Technical Specification (TS) 23.501, an NG-RAN node/radio can support the broadcasting of a total of twelve NIDs or twelve CAG-IDs. This means that a 3GPP Release 16 or later mobile device for the NID/NID-ID or CAG-ID use cases can be provisioned in a similar fashion to RCOI provisioning.

Accordingly, multi-bit roaming policies can be encoded into multi-bit IDP 3GPP broadcast IDs that can be provisioned for mobile devices to indicating multi-bit roaming policies accepted by an IDP and can be provisioned for a 3GPP RAN, via multi-bit ANP 3GPP broadcast IDs, to indicate multi-bit roaming policies supported by an ANP, such that a roaming policy federation architecture can be provided for a 3GPP-based network environment in a manner similar to that as is typically provided in WBA-defined OpenRoaming architectures.

Referring to FIG. 1B, FIG. 1B is a block diagram of another system 100' in which techniques that facilitate providing a roaming policy federation for a 3GPP network environment may be implemented, according to an example embodiment.

With the introduction of private 3GPP access networks or, stated differently 3GPP NPNs or 3GPP private networks, there is interest in supporting roaming scenarios that are conventionally provided by 3GPP architectures that support different visited mobile core network and home mobile core network data traffic routing scenarios. In particular, roaming onto private 3GPP networks is set to be adopted by a significant percentage of 3GPP NPN/private deployments.

Many of private 3GPP access deployments may only be interested in supporting in-bound roamers to enable those to benefit from connectivity to local networks and services, i.e., where all access point names (APNs) have a corresponding Local IP Access (LIPA)—Permission set to indicate LIPA_ONLY service such that user plane traffic for a mobile device is routed to one or more data network(s) via a visited mobile core network provided by an visited access network provider. Still, other private 3GPP access deployments may be interested in enabling home routing of user plane traffic for a mobile device using established roaming techniques in which traffic is routed back to a user's home mobile core network, typically referred to as 'HOME_ROUTED' service.

In some instances, operators that support outbound roamers onto a variety of NPNs that support LIPA_ONLY or HOME_ROUTED operation may which to optimize the selection of NPNs according to whether the NPN supports either LIPA_ONLY or HOME_ROUTED service.

For the embodiment of FIG. 1B, system 100' may be configured through which the identity federation entity 130 defines the use of federation wide PLMN-IDs for NPNs, which for the embodiment of FIG. 1B may be represented as a number of ANP systems and corresponding visited mobile core networks, such as an ANP system 110-1/visited mobile core network 160-1 and an ANP system 110-2/visited mobile core network 160-2. ANP system 110 may be referred to herein interchangeably as 'ANP 110-1' and ANP system 110-2 may be referred to herein interchangeably as 'ANP 110-2'.

Additionally, identity federation entity 130 may define the use of any multi-bit 3GPP broadcast identifiers (e.g., CSG-IDs, NIDs/NID-IDs, CAG-IDs, and/or GIN codes) to encode policy/service level information (e.g., service restrictions) for one or more IDPs, such as IDP system 120, which for the embodiment of FIG. 1B may be considered to be configured for a home mobile core network 104 (e.g., IDP AUTH element 122 may be configured as a PCF/PCRF/UDM/UDR/AAA server for home mobile core network).

Also shown in FIG. 1B are one or more data networks 170 (e.g., the Internet, an Internet Protocol (IP) Multimedia Subsystem (IMS), Ethernet network, Ethernet switching system(s), combinations thereof, and/or the like) that may interface with each of home mobile core network 104, visited mobile core network 160-1, and visited mobile core network 160-2. Home mobile core network 104 may also interface with visited mobile core network 160-1 and visited mobile core network 160-2 using 3GPP-defined interfaces (e.g., N32, N24, N58, N12, N16, N8, N10, etc. as prescribed at least by 3GPP TS 23.501).

It is to be understood that home mobile core network 104 may be configured as any combination of a (private or non-private) 4G/LTE core, 5GC/5GS, nG core or system (e.g., a 6G core/system, etc.), and/or the like as may be defined by 3GPP or other similar standards and may include any components, network elements, etc. in order to facilitate operations discussed herein. For example, in one instance for a 5G/nG mobile network core, radio nodes (not shown) may be configured for home mobile core network 104 and may further interface with at least one 3GPP AMF within the home mobile core network 104 and with one or more 3GPP UPFs within the home mobile core network 104. It is to be understood that other network elements may be configured for home mobile core network 104 for any combination of 3G/4G/5G/nG implementations, such as, a PCF, a PCRF, an AUSF, an NSSF, an NRF, a UDM/UDR, an SMF, an HSS, an MME, an SGW, a PGW, any CUPS components, and/or the like in accordance with any 3GPP specifications.

Generally, with the exception of enhancements discussed herein with regard to various LIPA_ONLY or HOME_ROUTED service features discussed for the embodiment of FIG. 1B, ANP system 110-1/visited mobile core network 160-1 and ANP system 110-1/visited mobile core network 160-1 can be configured and operate in a similar manner as discussed above with ANP system 110/mobile core network 160 of FIG. 1A. Further for the embodiment of FIG. 1B, it is to be understood that ANP system 110-1 and ANP system 110-2 provide overlapping RAN coverage via corresponding overlapping 3GPP RAN(s).

In one embodiment, one or more multi-bit 3GPP identifiers and/or bit positions within multi-bit 3GPP identifiers can be used to indicate policy information pertaining to a HOME_ROUTED or a LIPA_ONLY service. As illustrated in FIG. 2C, an indication of a preference for a mobile device to connect to an ANP system/access network (e.g., a visited radio access network) that provides local IP access service can be encoded via a 'LIPA_ONLY' indication or an indication of a preference for a mobile device to connect to an ANP system/access network (e.g., a visited radio access network) that provides home routed access service can be encoded via a 'HOME ROUTED' indication, as shown at 247 for Oct1/B1, in which the Oct1/B1 may be set to '1' to provide a LIPA_ONLY indication or the Oct1/B1 may set/unset to '0' to provide a HOME_ROUTED indication.

An NPN/ANP, such as each of ANP 110-1 and ANP 110-2, can configure one or more broadcast multi-bit 3GPP identifiers (e.g., a CSG-ID, NID/NID-ID, CAG-ID, and/or GIN code) corresponding to whether it supports LIPA_ONLY service capabilities or HOME_ROUTED service capabilities in its private network.

Further, an identity provider, such as IDP 120, can define at least one multi-bit IDP roaming policy/policies 121' that can be encoded, along with all bit-wise combinatorial permutations of the multi-bit IDP roaming policy/policies 121' into each of a corresponding multi-bit 3GPP broadcast identifier (e.g., a CSG-ID, NID/NID-ID, CAG-ID, or GIN code) in which the plurality of multi-bit 3GPP broadcast identifiers are configured for an IDP 3GPP broadcast ID list that can be provisioned in a whitelist for mobile device 102 in order to indicate whether mobile device 102 is authorized to access private/visited radio access networks with LIPA_ONLY support and/or to access private/visited radio access networks with HOME_ROUTED support.

For example, for instances in which IDP 120 supports only HOME_ROUTED service via an ANP, Octet 1/bit-1 can be set/unset to '0', such as '110000000100010' for the multi-bit IDP roaming policy 121' (following the example above for FIG. 1A in which, in addition to HOME_ROUTED service, the policy 121' can cover any identity, a service provider identity, a minimum QoS of a gold QoS, and privacy (baseline ID policy applies) such that the IDP 3GPP broadcast ID list 126' can be configured with multi-bit 3GPP broadcast identifiers including the (base) multi-bit IDP roaming policy 121' along with all combinatorial permutations thereof, as discussed above with reference to FIG. 1A (e.g., 12 multi-bit 3GPP broadcast identifiers can be configured for the IDP 3GPP broadcast ID list 126'). Note, remaining reserved bits for the multi-bit roaming policies are not discussed for certain examples for purposes of brevity only, however, it is to be understood that the full multi-bit roaming policies can have an appropriate bit length in accordance with embodiments herein.

Similarly, for instances in which IDP 120 supports only LIPA_ONLY service via an ANP, Octet 1/bit-1 can be set to '1', such as '110000000100011' for the multi-bit IDP roaming policy 121' (following the example above for FIG. 1A including other policy specific information) such that the IDP 3GPP broadcast ID list 126' can be configured to with multi-bit 3GPP broadcast identifiers including the (base) multi-bit IDP roaming policy 121' along with all combinatorial permutations thereof, as discussed above with reference to FIG. 1A (e.g., 12 multi-bit 3GPP broadcast identifiers can be configured for the IDP 3GPP broadcast ID list 126').

In other instances, an IDP, such as IDP 120 may support both HOME_ROUTED and LIPA_ONLY service for an ANP such that two multi-bit IDP roaming policies 121' can be configured, in which one multi-bit IDP roaming policy 121' includes Oct1/B1 being unset to indicate support for HOME_ROUTED service (e.g., '110000000100010') and another multi-bit IDP roaming policy 121' includes Oct1/B1 being set to '1' to indicate support for LIPA_ONLY service (e.g., (e.g., '110000000100011').

Combinatorial permutations of each multi-bit IDP roaming policy 121' and corresponding bit-wise combinatorial permutations of each policy thereof can be encoded in IDP 3GPP broadcast ID list 126' for any type of 3GPP broadcast ID format (e.g., CSG-ID/NID/NID-ID/CAG-ID/GIN code).

For embodiments in which IDP 120 supports both HOME_ROUTED and LIPA_ONLY services but prefers one service over the other, the multi-bit 3GPP broadcast identifiers can be configured in a given IDP 3GPP broadcast ID list in an order that represents a priority through which mobile device 102 is to seek access to a given visited radio access network. The plurality of multi-bit 3GPP broadcast identifiers (i.e., base multi-bit IDP roaming policies 121' and all combinatorial permutations thereof) as ordered in a given prioritized IDP 3GPP broadcast ID list can be provisioned via a whitelist of multi-bit 3GPP broadcast identifiers for mobile device 102 via any combination of an elementary file provisioned for the eUICC/SIM/eSIM of the mobile device 102 and/or any combination of memory element(s)/storage configured for the mobile device 102.

In accordance with embodiments herein, a mobile device, such as mobile device 102 that is configured with such a whitelist including a prioritized order of 3GPP broadcast IDs and that is in simultaneous coverage of two independent NPNs supporting federation service, such as ANP 110-1/110-2, in which a first NPN/ANP supports HOME ROUTED service and the second NPN/ANP supports LIPA_ONLY service and in which the mobile device 102 is authorized to access both LIPA_ONLY and HOME_ROUTED NPNs but in which a 3GPP broadcast ID list entry in the mobile device's 102 whitelist corresponding to a first service is placed in a higher priority in the whitelist compared to a second list entry corresponding to a second service, will preferentially select the NPN/ANP that is configured to support the first, higher priority service as indicated in the whitelist for attachment over the other NPN/ANP supporting the second but lower priority service as indicated in the whitelist.

Consider various example IDP 3GPP broadcast ID lists that may be configured via IDP 120, such as an example IDP 3GPP broadcast ID list 126" shown in FIG. 2D and another example IDP 3GPP broadcast ID list 126'" shown in FIG. 2E based on two multi-bit IDP roaming policies 121' (e.g., for CSG-IDs, zero-padded to the 28-bit nibble boundary), such as '1100000001000100000000000000' [indicating a HOME_ROUTED policy] and '1100000001000110000000000000' [indicating a LIPA_ONLY policy] in which the IDP 120 may support both HOME_ROUTED and LIPA_ONLY services, but may indicate a preference for one service over the other, as illustrated in FIGS. 2D and 2E.

For the embodiment of FIG. 1B, multi-bit 3GPP broadcast identifiers can be configured in a given IDP 3GPP broadcast ID list, such as 126″ (FIG. 2D) or 126‴ (FIG. 2E), for example, in an order that represents a priority through which mobile device 102 is to seek access/attachment to a given visited radio access network (e.g., ANP 110-1 or ANP 110-2). The plurality of multi-bit 3GPP broadcast identifiers (i.e., each base multi-bit IDP roaming policy 121′ and all combinatorial permutations of each policy thereof) as ordered in a given prioritized IDP 3GPP broadcast ID list (e.g., 126″ or 126‴) can be provisioned via a whitelist of the multi-bit 3GPP broadcast identifiers for mobile device 102 via any combination of an elementary file provisioned for the eUICC/SIM/eSIM of the mobile device 102 and/or any combination of memory element(s)/storage configured for the mobile device 102.

For example, as shown in FIG. 2D, IDP 3GPP broadcast ID list 126″, which is organized in a prioritized order, indicates a preference of IDP 120 for attachment of mobile device to an NPN/ANP that supports HOME_ROUTED service (indicated via CSG-IDs 270) over attachment of mobile device 102 to an ANP that supports LIPA_ONLY service (indicated via CSG-IDs 271) and, in another example as shown in FIG. 2E via IDP 3GPP broadcast ID list 126‴, IDP 120 may indicate a preference for attachment of mobile device 102 to an ANP that supports LIPA_ONLY service (indicated via CSG-IDs 280) over attachment of mobile device 102 to an ANP that supports HOME_R-OUTED service (indicated via CSG-IDs 281).

In one instance for the embodiment of FIG. 1B, consider that ANP 110-1 supports HOME_ROUTED service capabilities and broadcasts (via 3GPP RAN 113) a 3GPP broadcast ID of (utilizing a CSG-ID format) '0100000001000100000000000000' (e.g., ANP 110-1 only accepts SP identities, accepts private users, supports the gold QoS and Oct1/B1 is set/unset to '0' to indicate a HOME_R-OUTED service), whereas ANP 110-2, having overlapping 3GPP radio access coverage with ANP 110-1, supports LIPA_ONLY service capabilities and broadcasts (via its corresponding 3GPP RAN, not shown in FIG. 1B) a 3GPP broadcast ID of '0100000001000110000000000000' (e.g., ANP 110-2 only accepts SP identities, accepts private users, supports the gold QoS, and Oct1/B1 is set to '1' to indicate a LIPA_ONLY service).

In one example, consider that mobile device 102 is provisioned via a whitelist with IDP 3GPP broadcast ID 126″, as shown in FIG. 2D, that is organized in a prioritized manner such that IDs higher in the list have a higher priority than IDs lower in the list. In this example, mobile device 102 would detect both of 3GPP broadcast ID '0100000001000100000000000000' being broadcast by ANP 110-1 indicating support for HOME_ROUTED service (among other policies) and also 3GPP broadcast ID '0100000001000110000000000000' being broadcast by ANP 110-2 indicating support for LIPA_ONLY service (among other policies). In this example, CSG-ID 270*a* corresponding to '0100000001000100000000000000' is interpreted by mobile device 102 as having a higher priority than CSG-ID 271*a* corresponding to '0100000001000110000000000000' given that CSG-ID 270*a* is higher in priority (e.g., higher in the order of the list) than CSG-ID 271*a* (e.g., lower in the order of the list) for the IDP 3GPP broadcast ID list 126″. Thus, mobile device 102 would seek attachment with ANP 110-1 in this example, based on the prioritized order of CSG-IDs configured for IDP 3GPP broadcast ID list 126″, such that successful attachment of mobile device 102 with ANP 110-1, through authentication with IDP 120, can result in HOME_R-OUTED traffic 171 between mobile device 102 and data network(s) 170 being routed via ANP 110-1/visited mobile core network 160-1 and home mobile core network 104.

In another example, consider that mobile device 102 is provisioned via a whitelist with IDP 3GPP broadcast ID 126‴, as shown in FIG. 2E, that is organized in a prioritized manner such that IDs higher in the list have a higher priority than IDs lower in the list. In this example, mobile device 102 would detect both of 3GPP broadcast ID '0100000001000100000000000000' being broadcast by ANP 110-1 indicating support for HOME_ROUTED service (among other policies) and also 3GPP broadcast ID '0100000001000110000000000000' being broadcast by ANP 110-2 indicating support for LIPA_ONLY service (among other policies). Further for this example, CSG-ID 280*a* corresponding to '0100000001000110000000000000' is interpreted by mobile device 102 as having a higher priority than CSG-ID 281*a* corresponding to '0100000001000100000000000000' given that CSG-ID 280*a* is higher in priority (e.g., higher in the order of the list) than CSG-ID 281*a* (e.g., lower in the order of the list) for the IDP 3GPP broadcast ID list 126‴. In this example mobile device 102 would seek attachment with ANP 110-2, based on the prioritized order of CSG-IDs configured for IDP 3GPP broadcast ID list 126‴, such that successful attachment of mobile device 102 with ANP 110-2, through authentication with IDP 120, can result in LIPA_ONLY traffic 172 between mobile device 102 and data network(s) 170 being routed via ANP-110-2/visited mobile core network 160-2.

Accordingly, prioritized 3GPP ID list ordering based on preference(s) can be used to enable optimized automatic network selection across a collection of NPNs operating as a roaming federation in accordance with embodiments herein.

Referring to FIG. 3A, FIG. 3A is a flow chart depicting a method 300 according to an example embodiment. In at least one embodiment, operations associated with method 300 may be performed, at least in part, by an IDP, such as, for example via policy encoding logic 124 and mobile device provisioning logic 128 configured for one or more computing devices of IDP system 120.

At 302, the method may include encoding a multi-bit roaming policy for an identity provider within a plurality of multi-bit 3GPP broadcast identifiers in which the multi-bit roaming policy includes bit-wise roaming policy information for the identity provider At 304, the method may include configuring the plurality of multi-bit 3GPP broadcast identifiers for a mobile device associated with the identity provider.

In one instance, the multi-bit roaming policy may be represented by a Roaming Consortium Organizational Identifier (RCOI).

In some embodiments, the plurality of multi-bit 3GPP broadcast identifiers may be plurality of closed subscriber group (CSG) identifiers (CSG-IDs) and configuring the multi-bit roaming policy for the mobile device further may include determining a plurality of bit-wise combinatorial permutations of the multi-bit roaming policy and configuring each of the plurality of bit-wise permutations for the mobile device in which each bit-wise combinatorial permutation of the multi-bit roaming policy is associated with different CSG-ID. In some embodiments, configuring the plurality of 3GPP broadcast identifiers for the mobile device may include determining a plurality of bit-wise combinatorial permutations of the multi-bit roaming policy and configuring one of the multi-bit roaming policy or one of plurality of bit-wise permutations for the mobile device in each of different CSG-IDs.

In some embodiments, the plurality of multi-bit 3GPP broadcast identifiers may be a plurality of network identifier (NIDs) and configuring the multi-bit roaming policy for the mobile device may include determining a plurality of bit-wise combinatorial permutations of the multi-bit roaming policy; and configuring each of the plurality of bit-wise combinatorial permutations for the mobile device, wherein each bit-wise permutation of the multi-bit roaming policy is associated with a different NID. In some embodiments, the plurality of multi-bit 3GPP broadcast identifiers may be configured as a plurality of different NIDs/NID-IDs, each including one of the multi-bit roaming policy or a bit-wise combinatorial permutation of the multi-bit roaming policy. In some embodiments, the plurality of multi-bit 3GPP broadcast identifiers may be configured as a plurality of different closed access group identifiers (CAG-IDs), each including one of the multi-bit roaming policy or a bit-wise combinatorial permutation of the multi-bit roaming policy. In some embodiments, the plurality of multi-bit 3GPP broadcast identifiers may be configured as a plurality of Group Identifier for Network selection (GIN) codes, each including one of the multi-bit roaming policy or a bit-wise combinatorial permutation of the multi-bit roaming policy.

Although not illustrated in FIG. 3A, in one instance the method may include configuring a first public land mobile network (PLMN) identifier indicating a settled-access for a visited radio access network; configuring a second PLMN identifier indicating a settlement-free access for the visited radio access network, wherein the visited radio access network is to broadcast one of the first PLMN identifier and the second PLMN identifier; and configuring at least one of the first PLMN identifier and the second PLMN identifier for the mobile device.

Figure 3B:
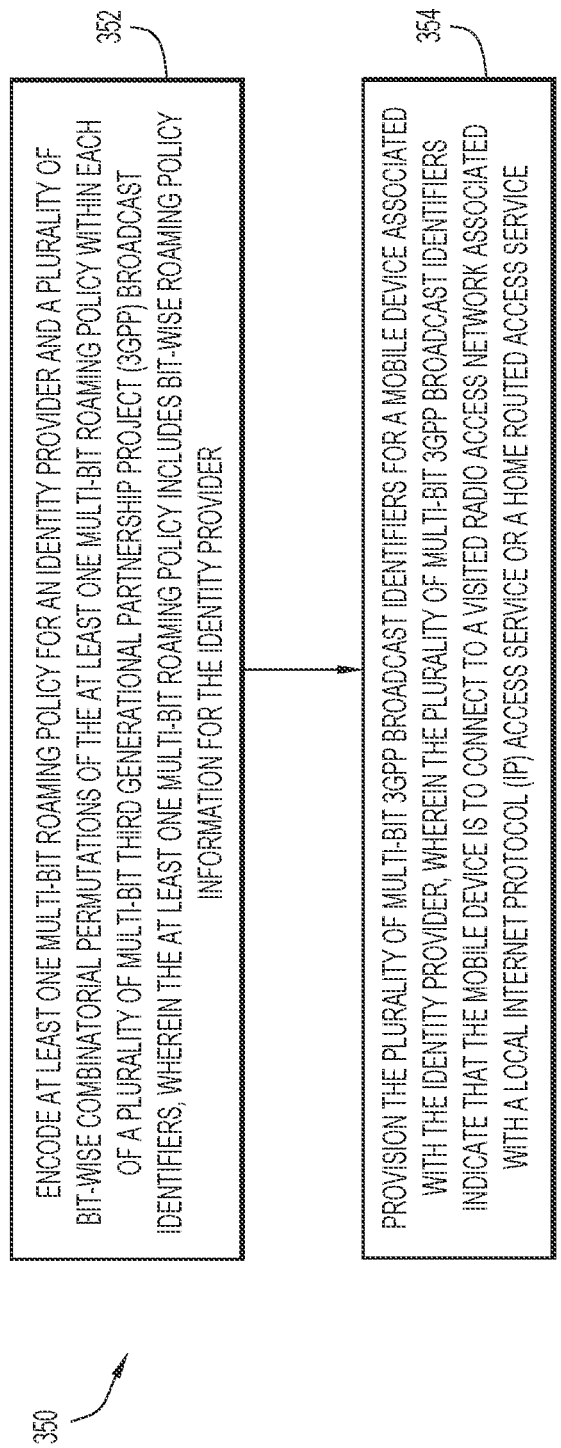
FIG. 3B is yet another flow chart depicting another method according to an example embodiment.

Referring to FIG. 3B, FIG. 3B is a flow chart depicting a method 350 according to an example embodiment. In at least one embodiment, operations associated with method 350 may be performed, at least in part, by an IDP, such as, for example via policy encoding logic 124 and mobile device provisioning logic 128 configured for one or more computing devices of IDP system 120.

At 352, the method may include encoding at least one multi-bit roaming policy for an identity provider and a plurality of bit-wise combinatorial permutations of the at least one multi-bit roaming policy within each of a plurality of multi-bit Third Generational Partnership Project (3GPP) broadcast identifiers, wherein the at least one multi-bit roaming policy includes bit-wise roaming policy information for the identity provider; and At 354, the method may include provisioning the plurality of multi-bit 3GPP broadcast identifiers for a mobile device associated with the identity provider, wherein the plurality of multi-bit 3GPP broadcast identifiers indicate that the mobile device is to connect to a visited radio access network associated with a local Internet Protocol (IP) access service or a home routed access service.

In some instances, the identity provider may support both the local IP access service and the home routed service such that at least two multi-bit roaming policies may be provided/supported by the identity provider. In such instances, the plurality of multi-bit 3GPP broadcast identifiers are configured for the mobile device in a prioritized order that identifies a preference of the identity provider for the mobile device to connect to a visited radio access network based on the prioritized order. The prioritized order may identify a preference of the identity provider for the mobile device to connect to an access network that is configured to provide one of the local IP access service or the home routed access service.

Figure 4A:
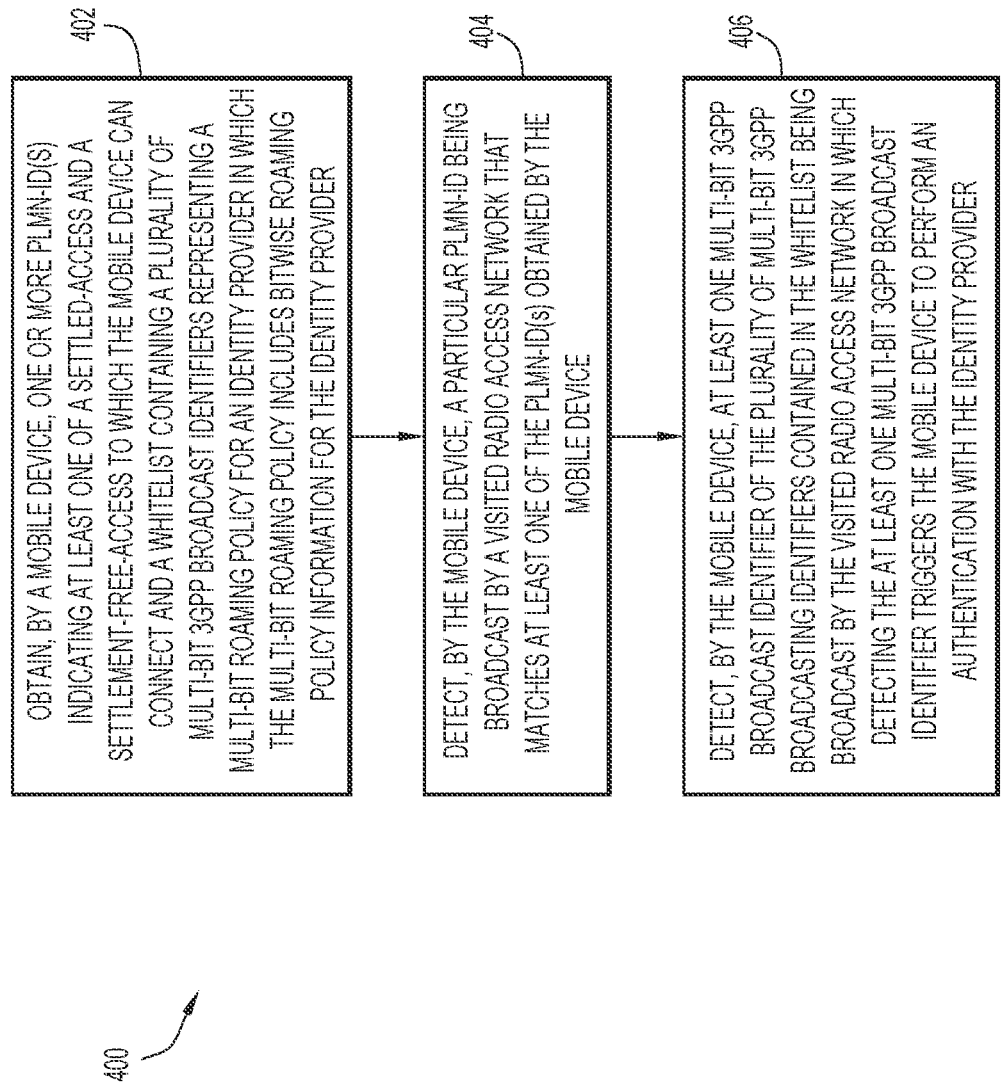
FIG. 4A is another flow chart depicting another method according to an example embodiment.

Referring to FIG. 4A, FIG. 4A is another flow chart depicting another method 400 according to an example embodiment. In at least one embodiment, operations associated with method 400 may be performed, at least in part, a mobile device, such as mobile device 102 discussed herein.

At 402, the method may include obtaining, by the mobile device, one or more PLMN-ID(s) indicating at least one of a settled-access and a settlement-free-access to which the mobile device can connect and a whitelist containing a plurality of multi-bit 3GPP broadcast identifiers representing a multi-bit roaming policy for an identity provider (e.g., IDP 120) in which the multi-bit roaming policy includes bitwise roaming policy information for the identity provider. In one embodiment, the whitelist containing the plurality of multi-bit 3GPP broadcast identifiers may be configured in a prioritized order that identifies a preference for the mobile device to connect to a visited radio access network. In one embodiment, the prioritized order identifies a preference for the mobile device to connect to a visited radio access network that is configured to provide one of local internet protocol (IP) access service or home routed access service.

In some embodiments, the plurality of multi-bit 3GPP broadcast identifiers may be plurality of closed subscriber group (CSG) identifiers (CSG-IDs). In some embodiments, the plurality of multi-bit 3GPP broadcast identifiers may be a plurality of network identifier (NIDs). In some embodiments, the plurality of multi-bit 3GPP broadcast identifiers may be a plurality of closed access group identifiers (CAG-IDs). In some embodiments, the plurality of multi-bit 3GPP broadcast identifiers may be a plurality of Group Identifier for Network selection (GIN) codes.

At 404, the method may include detecting, by the mobile device, a particular PLMN-ID being broadcast by a visited radio access network that matches at least one of the PLMN-ID(s) obtained by the mobile device from one or more elementary files stored in any combination of an Embedded Universal Integrated Circuit Card (eUICC), SIM card, and/or embedded SIM (eSIM).

At 406, the method may include detecting, by the mobile device, at least one multi-bit 3GPP broadcast identifier of the plurality of multi-bit 3GPP broadcasting identifiers contained in the whitelist being broadcast by the visited radio access network in which detecting the at least one multi-bit 3GPP broadcast identifier triggers the mobile device to perform an authentication with the identity provider. As illustrated in FIG. 4A, the configuring at 402 is performed before the detecting at 404 and 406. In one instance, the visited radio access network is a 3GPP radio access network provided by an access network provider (e.g., 3GPP RAN 113/radio nodes 114 provided by ANP 110) that is not the identity provider. In one instance, the multi-bit roaming policy of the IDP may be represented using a multi-bit Roaming Consortium Organizational Identifier (RCOI).

In one embodiment, the detecting at 406 may include the mobile device obtaining a broadcast transmission from a radio node of the visited radio access network in which the broadcast transmission includes at least one PLMN-ID and a multi-bit 3GPP broadcast identifier (e.g., a CSG-ID or NID) in a first SIB (SIB-1) of the broadcast transmission and, after matching the broadcast PLMN-ID to a PLMN-ID provisioned for the mobile device, performing a comparison between the obtained multi-bit 3GPP broadcast identifier and the whitelist of multi-bit 3GPP broadcast identifiers provided for the mobile device to determine whether the RAN transmitted multi-bit 3GPP broadcast identifier matches one of the multi-bit 3GPP broadcast identifiers of the whitelist. Determining a match between a transmitted multi-bit 3GPP broadcast identifier and a corresponding whitelisted multi-bit 3GPP broadcast identifier can trigger the mobile device to authenticate onto the visited radio access network via a successful authentication with the identity provider.

Figure 4B:
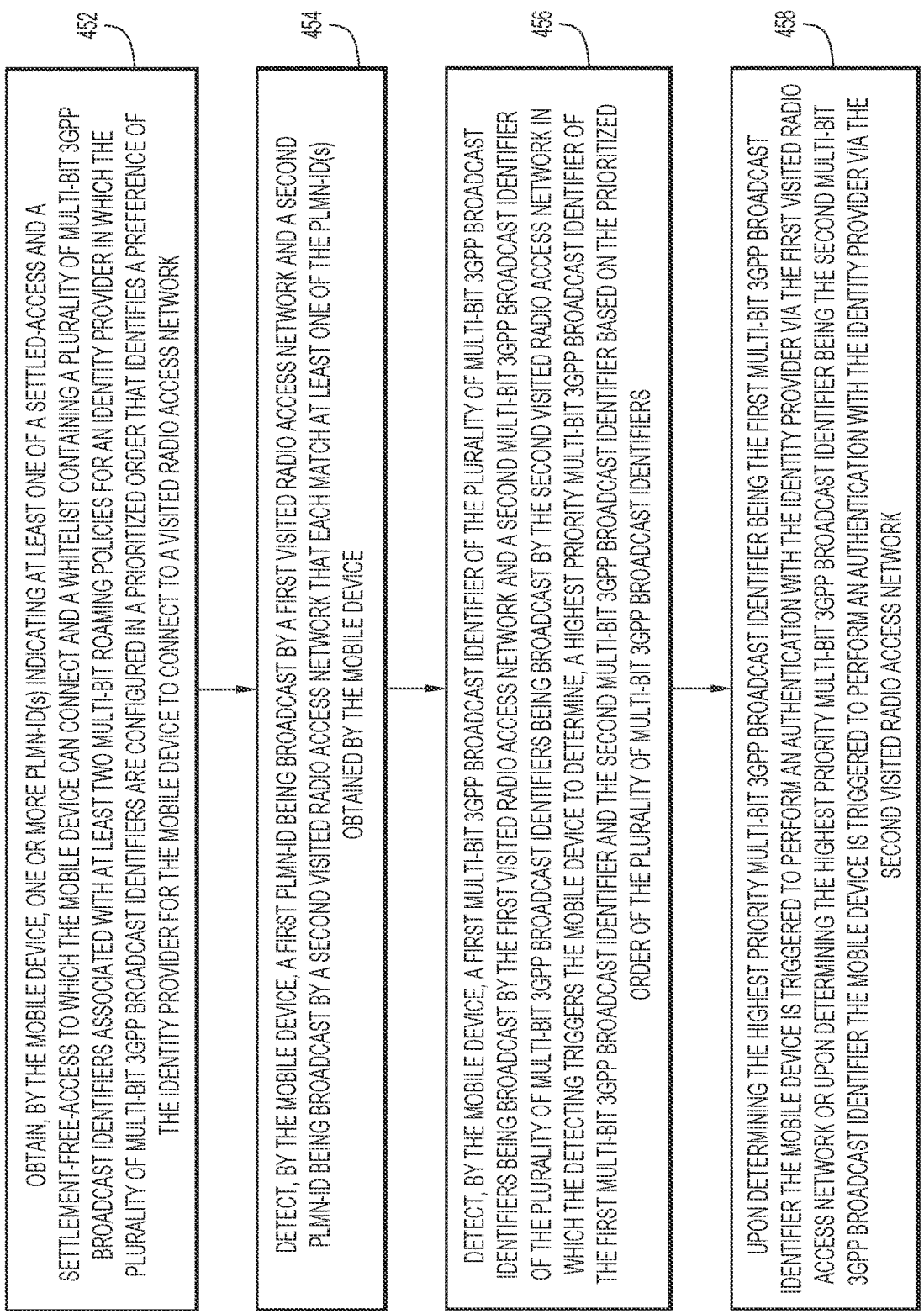
FIG. 4B is yet another flow chart depicting another method according to an example embodiment.

Referring to FIG. 4B, FIG. 4B is yet another flow chart depicting another method 450 according to an example embodiment. In at least one embodiment, operations associated with method 450 may be performed, at least in part, a mobile device, such as mobile device 102 discussed herein.

At 452, the method may include obtaining, by the mobile device, one or more PLMN-ID(s) indicating at least one of a settled-access and a settlement-free-access to which the mobile device can connect and a whitelist containing a plurality of multi-bit 3GPP broadcast identifiers associated with at least two multi-bit roaming policies for an identity provider (e.g., IDP 120) in which the plurality of multi-bit 3GPP broadcast identifiers are configured in a prioritized order that identifies a preference of the identity provider for the mobile device to connect to a visited radio access network.

In one embodiment, the prioritized order identifies a preference for the mobile device to connect to a visited radio access network that is configured to provide one of a local internet protocol (IP) access service or a home routed access service.

At 452, the method may include detecting, by the mobile device, a first PLMN-ID being broadcast by a first visited radio access network and a second PLMN-ID being broadcast by a second visited radio access network that each match at least one of the PLMN-ID(s) obtained by the mobile device from one or more elementary files stored in any combination of an eUICC, SIM card, and/or eSIM.

At 456, the method may include detecting, by the mobile device, a first multi-bit 3GPP broadcast identifier of the plurality of multi-bit 3GPP broadcast identifiers being broadcast by the first visited radio access network and a second multi-bit 3GPP broadcast identifier of the plurality of multi-bit 3GPP broadcast identifiers being broadcast by the second visited radio access network in which the detecting triggers the mobile device to determine, a highest priority multi-bit 3GPP broadcast identifier of the first multi-bit 3GPP broadcast identifier and the second multi-bit 3GPP broadcast identifier based on the prioritized order of the plurality of multi-bit 3GPP broadcast identifiers.

At 458, the method may include upon determining the highest priority multi-bit 3GPP broadcast identifier being the first multi-bit 3GPP broadcast identifier, the mobile device is triggered to perform an authentication with the identity provider via the first visited radio access network or upon determining the highest priority multi-bit 3GPP broadcast identifier being the second multi-bit 3GPP broadcast identifier the mobile device is triggered to perform an authentication with the identity provider via the second visited radio access network.

Broadly, the operations at 454, 456, and 458 may include the mobile device obtaining a broadcast transmission from a radio node of the first visited radio access network and obtaining a broadcast transmission from a radio node of the second visited radio access network in which each broadcast transmission includes at least one PLMN-ID and a multi-bit 3GPP broadcast identifier (e.g., a CSG-ID,NID(s), CAG-ID(s), GIN code(s)) in a first SIB (SIB-1) of each broadcast transmission for each visited radio access network and, after matching each broadcast PLMN-ID for each visited radio access network to a PLMN-ID provisioned for the mobile device, performing a comparison between the obtained multi-bit 3GPP broadcast identifier and the whitelist of multi-bit 3GPP broadcast identifiers provided for the mobile device to determine whether either or both RAN transmitted multi-bit 3GPP broadcast identifier for each visited radio access network matches one of the multi-bit 3GPP broadcast identifiers of the whitelist.

Upon determining a match for each multi-bit 3GPP broadcast identifier broadcast by each visited radio access network, the mobile device can determine which transmitted multi-bit 3GPP broadcast identifier is highest in the prioritized order of the multi-bit 3GPP broadcast identifiers contained in the whitelist. Determining the highest priority multi-bit 3GPP broadcast identifier in the list for a given visited radio access network can trigger the mobile device to authenticate onto the (highest priority) visited radio access network via a successful authentication with the identity provider.

Figure 5:
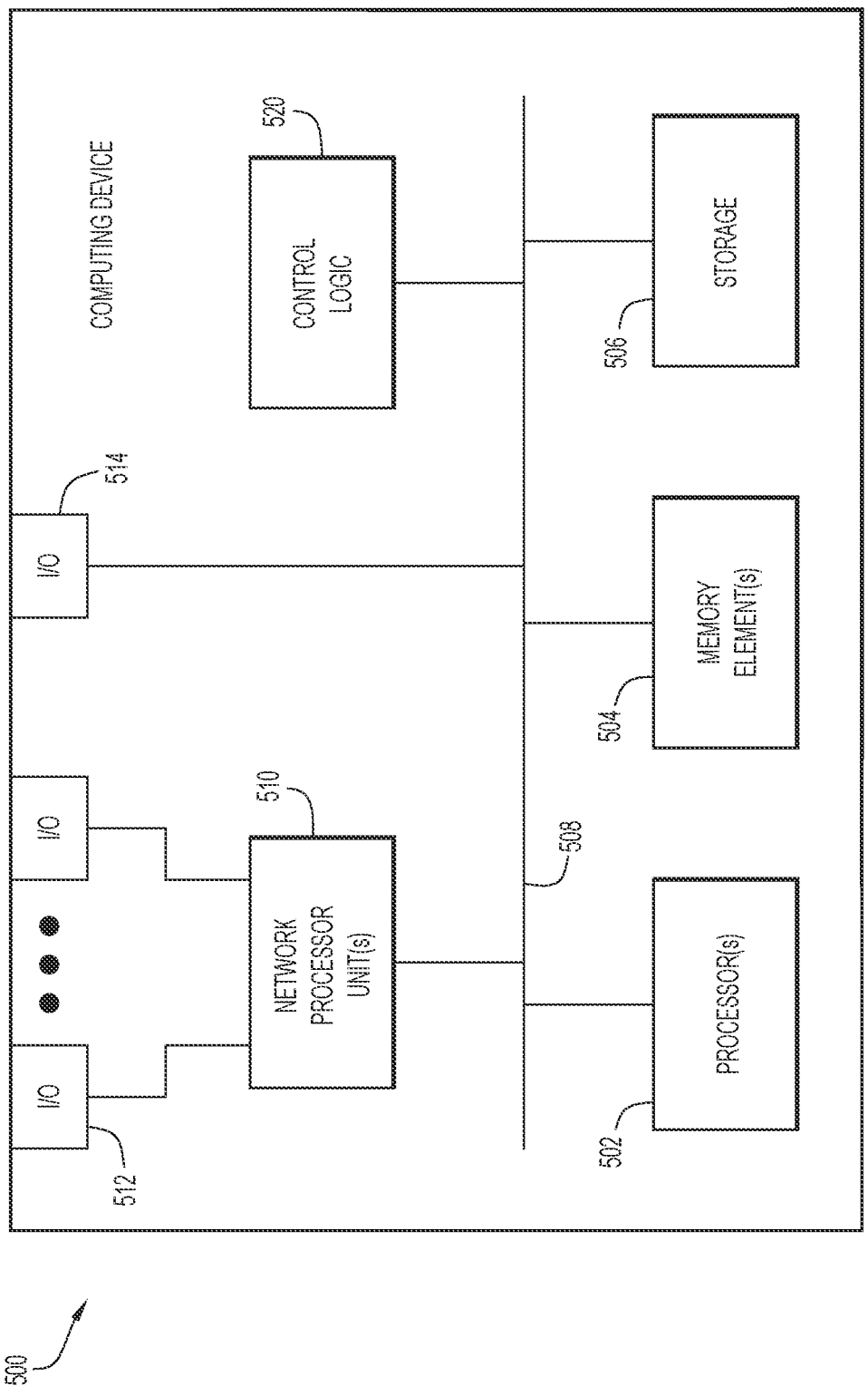
FIG. 5 is a hardware block diagram of a computing device that may perform functions associated with any combination of operations discussed herein in connection with the techniques discussed herein.

Referring to FIG. 5, FIG. 5 illustrates a hardware block diagram of a computing device 500 that may perform functions associated with operations discussed herein. In various embodiments, a computing device, such as computing device 500 or any combination of computing devices 500, may be configured as any entity/entities as depicted herein in order to perform operations of the various techniques discussed herein.

In at least one embodiment, computing device 500 may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520. In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device. Processor(s) 502 (e.g., hardware processor(s)) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with memory element(s) 504 (or vice versa) or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, and/or any other I/O port(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to computing device 500. For example, I/O interface(s) 514 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

For example, in at least one implementation, control logic 520 can be implemented as any combination of policy encoding logic 124 and mobile device provisioning logic 128 for IDP 120 and can include instructions that, when executed, cause processor(s) 502 to perform operations including, but not limited to, encoding a multi-bit roaming policy for an identity provider within a plurality of multi-bit Third 3GPP broadcast identifiers in which the multi-bit roaming policy includes bit-wise roaming policy information for the IDP; and configuring the plurality of multi-bit 3GPP broadcast identifiers for a mobile device associated with the IDP.

Figure 6:
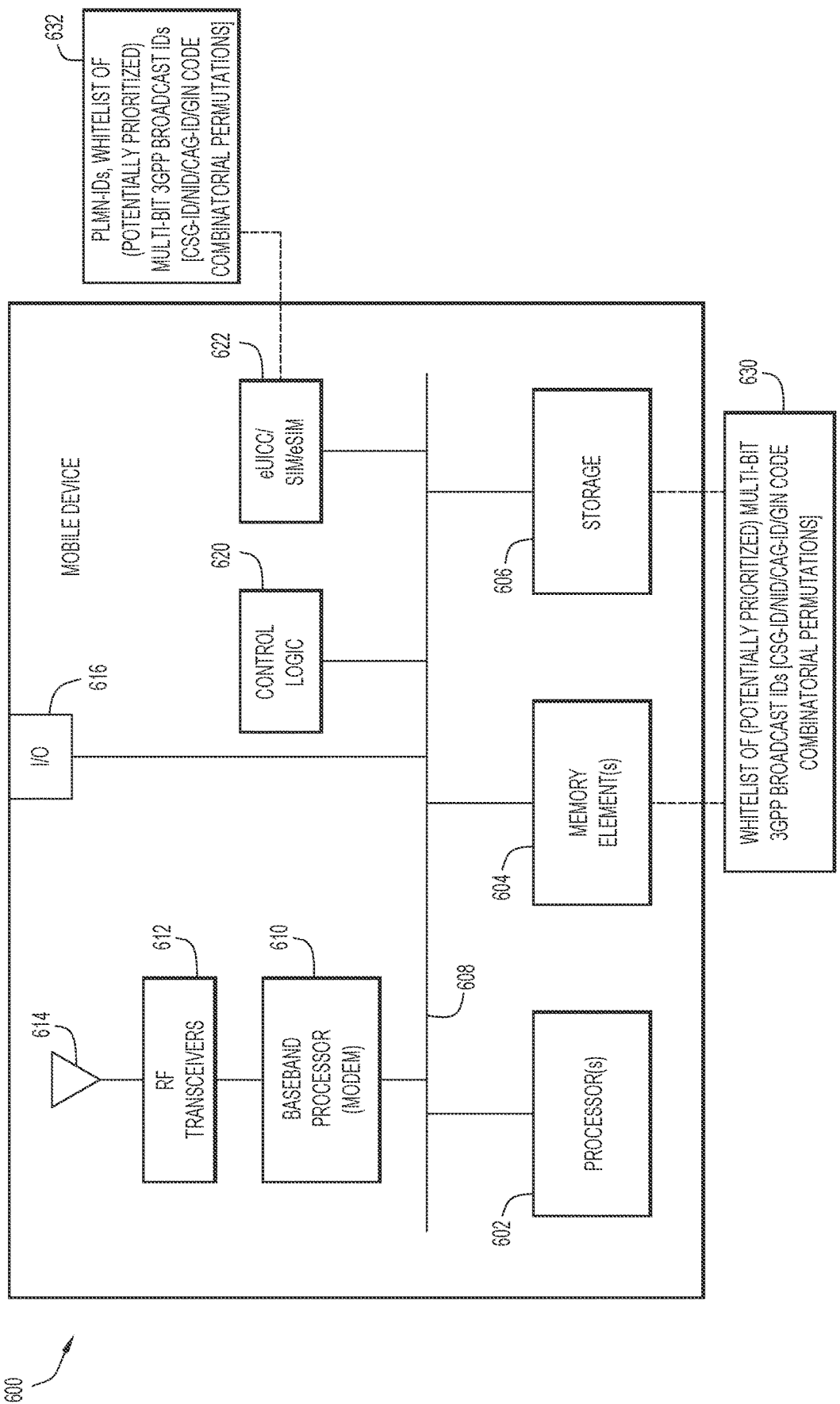
FIG. 6 is a hardware block diagram of a mobile device that may perform functions associated with any combination of operations discussed herein in connection with the techniques discussed herein.

Referring to FIG. 6, FIG. 6 illustrates a hardware block diagram of a mobile device 600 that may perform functions associated with operations discussed herein. In various embodiments, a mobile device, such as mobile device 600 or any combination of mobile devices 600, may be configured as mobile device 102 as discussed in connection with techniques discussed herein.

In at least one embodiment, mobile device 600 may include one or more processor(s) 602, one or more memory element(s) 604, storage 606, a bus 608, a baseband processor or modem 610, one or more radio RF transceiver(s) 612, one or more antennas or antenna arrays 614, one or more I/O interface(s) 616, control logic 620, and any combination of an eUICC, SIM, and/or eSIM 622. Also illustrated in FIG. 6, one or more (home-network) PLMN-ID(s) may be configured for the eUICC/SIM/eSIM 622 (e.g., to indicate an IDP roaming support for settlement free access and/or settled access), as shown at 632. Further, a whitelist of (potentially prioritized) multi-bit 3GPP broadcast ID(s) (e.g., (potentially prioritized) CSG-ID/NID/CAG-ID/GIN code combinatorial permutations may be stored in any combination of the eUICC/SIM/eSIM 622 (as shown at 632), memory element(s) 604 and/or storage 606, as shown at 630. In various embodiments, instructions associated with logic for mobile device 600 can overlap in any manner and are not limited to the specific allocation of instructions and/or operations described herein.

The one or more processor(s) 602, one or more memory element(s) 604, storage 606, bus 608, and I/O interface(s) 616 may be configured/implemented in any manner described herein, such as described herein at least with reference to FIG. 5. The RF transceiver(s) 612 perform RF transmission and RF reception of wireless signals via antenna(s)/antenna array(s) 614, and the baseband processor (modem) 610 performs baseband modulation and demodulation, etc. associated with such signals to enable wireless communications for mobile device 600.

In various embodiments, control logic 620, can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

For example, in at least one implementation, control logic 620 can include instructions that, when executed, cause processor(s) 602 to perform operations including, but not limited to, obtaining, by the mobile device 600, one or more PLMN-ID(s) indicating at least one of a settled-access and a settlement-free-access to which the mobile device can connect and a whitelist containing a plurality of multi-bit 3GPP broadcast identifiers representing a multi-bit roaming policy for an identity provider in which the multi-bit roaming policy includes bitwise roaming policy information for the identity provider; detecting, by the mobile device, a particular PLMN-ID being broadcast by a visited radio access network that matches at least one of the PLMN-ID(s) obtained by the mobile device; and detecting at least one multi-bit 3GPP broadcast identifier of the plurality of multi-bit broadcasting identifiers contained in the whitelist being broadcast by a visited radio access network in which detecting triggers the mobile device to perform an authentication with the identity provider.

Although not illustrated, it is to be understood that radio nodes 114 can also be configured with a baseband processor or modem, one or more radio RF transceiver(s), one or more antennas or antenna arrays, processor(s), memory element(s), storage, control logic, etc. to facilitate storing one or more 3GPP broadcast identifiers for ANP 110 for one or more operations described herein.

The programs described herein (e.g., control logic 520/620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, and register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504/604 and/or storage 506/606 can store data, software, code, instructions (e.g., processor instructions), logic, parameters, combinations thereof, and/or the like used for operations described herein. This includes memory element(s) 504/604 and/or storage 506/606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided that may include encoding a multi-bit roaming policy for an identity provider within a plurality of multi-bit Third Generational Partnership Project (3GPP) broadcast identifiers, wherein the multi-bit roaming policy includes bit-wise roaming policy information for the identity provider; and configuring the plurality of multi-bit 3GPP broadcast identifiers for a mobile device associated with the identity provider.

In one instance, detecting, by the mobile device, at least one multi-bit 3GPP broadcast identifier of the plurality of multi-bit 3GPP broadcast identifiers being broadcast by a visited radio access network triggers the mobile device to perform an authentication with the identity provider. In one instance, the configuring is performed before the detecting.

In one instance, the visited radio access network is a Third Generation Partnership Project (3GPP) radio access network provided by an access network provider that is not the identity provider. In one instance, the multi-bit roaming policy is represented using a Roaming Consortium Organizational Identifier (RCOI).

In one instance, the plurality of multi-bit 3GPP broadcast identifiers are a plurality of closed subscriber group (CSG) identifiers and configuring the multi-bit roaming policy for the mobile device further includes determining a plurality of bit-wise combinatorial permutations of the multi-bit roaming policy; and configuring each of the plurality of bit-wise combinatorial permutations for the mobile device, wherein each bit-wise combinatorial permutation of the multi-bit roaming policy is associated with a different CSG identifier.

In one instance, the plurality of multi-bit 3GPP broadcast identifiers are a plurality of network identifiers (NIDs) and configuring the multi-bit roaming policy for the mobile device further includes determining a plurality of bit-wise permutations of the multi-bit roaming policy; and configuring each of the plurality of bit-wise permutations for the mobile device, wherein each bit-wise permutation of the multi-bit roaming policy is associated with a different NID.

In one instance, the plurality of multi-bit 3GPP broadcast identifiers are at least one of plurality of closed subscriber group (CSG) identifiers or a plurality of network identifiers (NIDs) and configuring the multi-bit roaming policy for the mobile device further includes determining a plurality of bit-wise combinatorial permutations of the multi-bit roaming policy; and configuring each of the plurality of bit-wise combinatorial permutations for the mobile device, wherein each bit-wise combinatorial permutation of the multi-bit roaming policy is associated with at least one of a different CSG identifier and a different NID. In one instance, the plurality of multi-bit 3GPP broadcast identifiers may be configured as a plurality of different NIDs/NID-IDs, each including one of the multi-bit roaming policy or a bit-wise combinatorial permutation of the multi-bit roaming policy. In one instance, the plurality of multi-bit 3GPP broadcast identifiers may be configured as a plurality of different closed access group identifiers (CAG-IDs), each including one of the multi-bit roaming policy or a bit-wise combinatorial permutation of the multi-bit roaming policy. In one instance, the plurality of multi-bit 3GPP broadcast identifiers may be configured as a plurality of Group Identifier for Network selection (GIN) codes, each including one of the multi-bit roaming policy or a bit-wise combinatorial permutation of the multi-bit roaming policy.

In one instance, the method further include configuring a first public land mobile network (PLMN) identifier indicating a settled-access for a visited radio access network; configuring a second PLMN identifier indicating a settlement-free-access for the visited radio access network, wherein the visited radio access network is to broadcast one of the first PLMN identifier and the second PLMN identifier; and configuring at least one of the first PLMN identifier and the second PLMN identifier for the mobile device.

In one form, a computer-implemented method is provided that may include encoding at least one multi-bit roaming policy for an identity provider and a plurality of bit-wise combinatorial permutations of the at least one multi-bit roaming policy within each of a plurality of multi-bit Third Generational Partnership Project (3GPP) broadcast identifiers, wherein the at least one multi-bit roaming policy includes bit-wise roaming policy information for the identity provider; and provisioning the plurality of multi-bit 3GPP broadcast identifiers for a mobile device associated with the identity provider, wherein the plurality of multi-bit 3GPP broadcast identifiers indicate that the mobile device is to connect to a visited radio access network associated with a local Internet Protocol (IP) access service or a home routed access service.

In one instance, the identity provider supports both the local IP access service and the home routed service such that at least two multi-bit roaming policies may be provided/supported by the identity provider. In one instance, the plurality of multi-bit 3GPP broadcast identifiers are configured for the mobile device in a prioritized order that identifies a preference of the identity provider for the mobile device to connect to a visited radio access network based on the prioritized order. In one instance, the prioritized order identifies a preference of the identity provider for the mobile device to connect to an access network that is configured to provide one of the local IP access service or the home routed access service.

In one instance the method may include detecting, by the mobile device, a first multi-bit 3GPP broadcast identifier of the plurality of multi-bit 3GPP broadcast identifiers being broadcast by a first visited radio access network and a second multi-bit 3GPP broadcast identifier of the plurality of multi-bit 3GPP broadcast identifiers being broadcast by a second visited radio access network triggers the mobile device to determine, a highest priority multi-bit 3GPP broadcast identifier of the first multi-bit 3GPP broadcast identifier and the second multi-bit 3GPP broadcast identifier based on the prioritized order of the plurality of multi-bit 3GPP broadcast identifiers.

In one instance, determining the highest priority multi-bit 3GPP broadcast identifier being the first multi-bit 3GPP broadcast identifier triggers the mobile device to perform an authentication with the identity provider via the first visited radio access network or determining the highest priority multi-bit 3GPP broadcast identifier being the second multi-bit 3GPP broadcast identifier triggers the mobile device to perform an authentication with the identity provider via the second visited radio access network.

In at least one instance, detecting, by the mobile device, at least one multi-bit 3GPP broadcast identifier of the plurality of multi-bit 3GPP broadcast identifiers being broadcast by a visited radio access network triggers the mobile device to perform an authentication with the identity provider. In at least one instance, the at least one multi-bit roaming policy is represented using a Roaming Consortium Organizational Identifier (RCOI).

In at least one instance, the plurality of multi-bit 3GPP broadcast identifiers are one of: a plurality of closed subscriber group (CSG) identifiers; a plurality of network identifiers (NIDs); a plurality of closed access group (CAG) identifiers; or a plurality of group identifier for network selection (GIN) codes.

In summary, techniques herein may allow features that are typically associated with OpenRoaming's policy enablement to be realized for 3GPP networks using a combination of multi-bit 3GPP broadcast identifiers and mobile device provisioned identifiers that can potentially be prioritized and can represent multi-bit roaming policies for identity providers and for access network providers. In one instance, one or more of the plurality of multi-bit 3GPP broadcast identifiers may be encoded as one or more CSG-IDs that may be utilized to support 3GPP pre-Release 16 equipment and/or one or more of the plurality of multi-bit 3GPP broadcast identifiers may be encoded as one or more NIDs/NID-IDs, CAG-IDS, and/or GIN codes and may be used to support 3GPP R16 or later equipment.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, and/or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method, comprising:
   encoding at least one multi-bit roaming policy for an identity provider and a plurality of bit-wise combinatorial permutations of the at least one multi-bit roaming policy within each of a plurality of multi-bit Third Generational Partnership Project (3GPP) broadcast identifiers, wherein the at least one multi-bit roaming policy includes bit-wise roaming policy information for the identity provider; and
   provisioning the plurality of multi-bit 3GPP broadcast identifiers for a mobile device associated with the identity provider, wherein the plurality of multi-bit 3GPP broadcast identifiers indicate that the mobile device is to connect to a visited radio access network associated with a local Internet Protocol (IP) access service or a home routed access service.

2. The method of claim 1, wherein the identity provider supports both the local IP access service and the home routed access service.

3. The method of claim 2, wherein the plurality of multi-bit 3GPP broadcast identifiers are configured for the mobile device in a prioritized order that identifies a preference of the identity provider for the mobile device to connect to a visited radio access network based on the prioritized order.

4. The method of claim 3, wherein the prioritized order identifies a preference of the identity provider for the mobile device to connect to an access network that is configured to provide one of the local IP access service or the home routed access service.

5. The method of claim 4, wherein detecting, by the mobile device, a first multi-bit 3GPP broadcast identifier of the plurality of multi-bit 3GPP broadcast identifiers being broadcast by a first visited radio access network and a second multi-bit 3GPP broadcast identifier of the plurality of multi-bit 3GPP broadcast identifiers being broadcast by a second visited radio access network triggers the mobile device to determine, a highest priority multi-bit 3GPP broadcast identifier of the first multi-bit 3GPP broadcast identifier and the second multi-bit 3GPP broadcast identifier based on the prioritized order of the plurality of multi-bit 3GPP broadcast identifiers.

6. The method of claim 5, wherein determining the highest priority multi-bit 3GPP broadcast identifier being the first multi-bit 3GPP broadcast identifier triggers the mobile device to perform an authentication with the identity provider via the first visited radio access network or determining the highest priority multi-bit 3GPP broadcast identifier being the second multi-bit 3GPP broadcast identifier triggers the mobile device to perform an authentication with the identity provider via the second visited radio access network.

7. The method of claim 1, wherein detecting, by the mobile device, at least one multi-bit 3GPP broadcast identifier of the plurality of multi-bit 3GPP broadcast identifiers being broadcast by a visited radio access network triggers the mobile device to perform an authentication with the identity provider.

8. The method of claim 1, wherein the at least one multi-bit roaming policy is represented using a Roaming Consortium Organizational Identifier (RCOI).

9. The method of claim 1, wherein the plurality of multi-bit 3GPP broadcast identifiers are one of:
a plurality of closed subscriber group (CSG) identifiers;
a plurality of network identifiers (NIDs);
a plurality of closed access group (CAG) identifiers; or
a plurality of group identifier for network selection (GIN) codes.

10. A plurality of non-transitory computer readable storage media encoded with instructions that, when executed by a plurality of processors, causes the plurality of processors to perform operations, comprising:
encoding at least one multi-bit roaming policy for an identity provider and a plurality of bit-wise combinatorial permutations of the at least one multi-bit roaming policy within each of a plurality of multi-bit Third Generational Partnership Project (3GPP) broadcast identifiers, wherein the at least one multi-bit roaming policy includes bit-wise roaming policy information for the identity provider; and
provisioning the plurality of multi-bit 3GPP broadcast identifiers for a mobile device associated with the identity provider, wherein the plurality of multi-bit 3GPP broadcast identifiers indicate that the mobile device is to connect to a visited radio access network associated with a local Internet Protocol (IP) access service or a home routed access service.

11. The media of claim 10, wherein the identity provider supports both the local IP access service and the home routed access service.

12. The media of claim 11, wherein the plurality of multi-bit 3GPP broadcast identifiers are configured for the mobile device in a prioritized order that identifies a preference of the identity provider for the mobile device to connect to a visited radio access network based on the prioritized order.

13. The media of claim 12, wherein the prioritized order identifies a preference of the identity provider for the mobile device to connect to an access network that is configured to provide one of the local IP access service or the home routed access service.

14. The media of claim 13, wherein detecting, by the mobile device, a first multi-bit 3GPP broadcast identifier of the plurality of multi-bit 3GPP broadcast identifiers being broadcast by a first visited radio access network and a second multi-bit 3GPP broadcast identifier of the plurality of multi-bit 3GPP broadcast identifiers being broadcast by a second visited radio access network triggers the mobile device to determine, a highest priority multi-bit 3GPP broadcast identifier of the first multi-bit 3GPP broadcast identifier and the second multi-bit 3GPP broadcast identifier based on the prioritized order of the plurality of multi-bit 3GPP broadcast identifiers.

15. The media of claim 14, wherein determining the highest priority multi-bit 3GPP broadcast identifier being the first multi-bit 3GPP broadcast identifier triggers the mobile device to perform an authentication with the identity provider via the first visited radio access network or determining the highest priority multi-bit 3GPP broadcast identifier being the second multi-bit 3GPP broadcast identifier triggers the mobile device to perform an authentication with the identity provider via the second visited radio access network.

16. A system comprising:
at least one memory element for storing data; and
at least one processor for executing instructions associated with the data, wherein executing the instructions causes the system to perform operations, comprising:
encoding at least one multi-bit roaming policy for an identity provider and a plurality of bit-wise combinatorial permutations of the at least one multi-bit roaming policy within each of a plurality of multi-bit Third Generational Partnership Project (3GPP) broadcast identifiers, wherein the at least one multi-bit roaming policy includes bit-wise roaming policy information for the identity provider; and
provisioning the plurality of multi-bit 3GPP broadcast identifiers for a mobile device associated with the identity provider, wherein the plurality of multi-bit 3GPP broadcast identifiers indicate that the mobile device is to connect to a visited radio access network associated with a local Internet Protocol (IP) access service or a home routed access service.

17. The system of claim 16, wherein the identity provider supports both the local IP access service and the home routed access service.

18. The system of claim 17, wherein the plurality of multi-bit 3GPP broadcast identifiers are configured for the mobile device in a prioritized order that identifies a preference of the identity provider for the mobile device to connect to a visited radio access network based on the prioritized order.

19. The system of claim 18, wherein the prioritized order identifies a preference of the identity provider for the mobile device to connect to an access network that is configured to provide one of the local IP access service or the home routed access service.

20. The system of claim 18, wherein the plurality of multi-bit 3GPP broadcast identifiers are one of:
 a plurality of closed subscriber group (CSG) identifiers;
 a plurality of network identifiers (NIDs);
 a plurality of closed access group (CAG) identifiers; or
 a plurality of group identifier for network selection (GIN) codes.

\* \* \* \* \*